US012693507B2

(12) United States Patent
Takagi

(10) Patent No.: US 12,693,507 B2
(45) Date of Patent: Jul. 28, 2026

(54) MICROSCOPE OBJECTIVE LENS, MICROSCOPE OPTICAL SYSTEM, AND MICROSCOPE DEVICE

(71) Applicant: NIKON CORPORATION, Tokyo (JP)

(72) Inventor: Hidetsugu Takagi, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 192 days.

(21) Appl. No.: 18/552,361

(22) PCT Filed: Feb. 25, 2022

(86) PCT No.: PCT/JP2022/007908
§ 371 (c)(1),
(2) Date: Sep. 25, 2023

(87) PCT Pub. No.: WO2022/209483
PCT Pub. Date: Oct. 6, 2022

(65) Prior Publication Data
US 2024/0019676 A1      Jan. 18, 2024

(30) Foreign Application Priority Data
Mar. 30, 2021      (JP) ................................. 2021-057545

(51) Int. Cl.
*G02B 21/00* (2006.01)
*G02B 21/02* (2006.01)
(52) U.S. Cl.
CPC ......... *G02B 21/0072* (2013.01); *G02B 21/02* (2013.01)

(58) Field of Classification Search
CPC .... G02B 21/0072; G02B 21/02; G02B 21/00; G02B 21/0004; G02B 21/002;
(Continued)

(56) References Cited

U.S. PATENT DOCUMENTS 4,563,060 A * 1/1986 Yamagishi ............. G02B 21/02
                                                          359/759
4,591,243 A * 5/1986 Yamagishi ............. G02B 21/02
                                                          359/759
(Continued)

FOREIGN PATENT DOCUMENTS

CN       210376860 U      4/2020
JP       60-14215 A       1/1985
(Continued)

OTHER PUBLICATIONS

Written Opinion of the International Searching Authority dated May 24, 2022 for International Application No. PCT/JP2022/007908.
(Continued)

*Primary Examiner* — Arnel C Lavarias

(57) ABSTRACT
A microscope objective lens (OL) includes a first lens group (G1) having positive refractive power, a second lens group (G2) having a concave surface facing the image side, and a third lens group (G3) having a concave surface facing the object side, which are arranged in order from the object side along an optical axis. The first lens group (G1) includes one lens component having positive refractive power, the third lens group (G3) includes three or more lenses including two negative lenses and one positive lens, and at least one predetermined negative lens in the two negative lenses satisfies the conditional expression "vdA<40".

18 Claims, 14 Drawing Sheets

(58) Field of Classification Search
CPC ....................... G02B 21/0024; G02B 21/0032;
G02B 21/06; G02B 21/36; G02B 21/361;
G02B 9/00; G02B 9/12; G02B 9/64
USPC ....... 359/368, 362, 363, 369, 385, 642, 656,
359/661, 754, 784, 792, 796, 797
See application file for complete search history.

(56) References Cited

U.S. PATENT DOCUMENTS

| | | | | |
|---|---|---|---|---|
| 8,988,780 | B2 | 3/2015 | Matthae et al. | |
| 2016/0116724 | A1 | 4/2016 | Abe | |
| 2016/0231541 | A1* | 8/2016 | Furuya | G02B 13/0095 |
| 2017/0010454 | A1 | 1/2017 | Abe | |
| 2017/0322404 | A1 | 11/2017 | Abe | |
| 2023/0152565 | A1* | 5/2023 | Kusui | G02B 21/02 |
| | | | | 359/656 |

FOREIGN PATENT DOCUMENTS

| | | |
|---|---|---|
| JP | 2004-29067 | 1/2004 |
| JP | 2013-156579 A | 8/2013 |
| JP | 2016-85335 A | 5/2016 |
| JP | 2017-16066 A | 1/2017 |

OTHER PUBLICATIONS

Japanese Office Action dated Jun. 4, 2024 for Japanese Application No. 2023-510675.
International Search Report dated May 24, 2022 from International Patent Application No. PCT/JP2022/007908.
Chinese Office Action issued Apr. 23, 2026 for Application No. 20228002260.3.

* cited by examiner

LATERAL COLOR (mm)

*FIG.9*

LATERAL COLOR (mm)

MICROSCOPE OBJECTIVE LENS, MICROSCOPE OPTICAL SYSTEM, AND MICROSCOPE DEVICE

CROSS REFERENCE TO RELATED APPLICATIONS

This application is a U.S. National Stage Application which claims the benefit under 35 U.S.C. § 371 of International Patent Application No. PCT/JP2022/007908 filed on Feb. 25, 2022, which claims priority benefit from Japanese Patent Application No. 2021-057545 filed on Mar. 30, 2021, the contents of each of which are incorporated herein by reference.

TECHNICAL FIELD

The present invention relates to a microscope objective lens, a microscope optical system, and a microscope device.

TECHNICAL BACKGROUND

In recent years, objective lenses that are for microscopes, and that have a high magnification and a high numerical aperture have variously been proposed (for example, see Patent literature 1). Various aberrations including chromatic aberration of magnification of such objective lenses are required to be favorably corrected.

PRIOR ARTS LIST

Patent Document

Patent literature 1: U.S. Pat. No. 8,988,780

SUMMARY OF THE INVENTION

A microscope objective lens according to a first present invention consists of, in order from an object on an optical axis: a first lens group having a positive refractive power; a second lens group having a concave surface facing an image; and a third lens group having a concave surface facing the object, wherein the first lens group consists of a lens component having a positive refractive power, the third lens group consists of three or more lenses that include two negative lenses and one positive lens, and at least one predetermined negative lens in the two negative lenses satisfies the following conditional expression, $$\nu_{dA} < 40$$

where $\nu dA$: an Abbe number of the predetermined negative lens of the third lens group.

A microscope objective lens according to a second present invention consists of, in order from an object on an optical axis: a first lens group having a positive refractive power; a second lens group having a concave surface facing an image; and a third lens group having a concave surface facing the object, wherein the first lens group consists of a lens component having a positive refractive power, and the second lens group includes a predetermined positive lens, which satisfies the following conditional expressions, $$\nu_{d2P} < 35$$

$$0 < \theta 2P - (0.6438 - 0.001682 \times \nu d2P + 0.008)$$

where $\nu d2P$: an Abbe number of the predetermined positive lens of the second lens group, and $\theta 2P$: a partial dispersion ratio of the predetermined positive lens of the second lens group, defined by the following expression assuming that a refractive index of the predetermined positive lens for g-line is ng2P, a refractive index of the predetermined positive lens for F-line is nF2P, and a refractive index of the predetermined positive lens for C-line is nC2P, $$\theta 2P = (ng2P - nF2P)/(nF2P - nC2P).$$

A microscope optical system according to the present invention comprises: the microscope objective lens described above; and a second objective lens that collects light from the microscope objective lens.

A microscope device according to the present invention comprises the microscope objective lens described above.

BRIEF DESCRIPTION OF THE DRAWINGS

FIG. 9 is a sectional view showing a configuration of a microscope objective lens according to a Third Example;

DESCRIPTION OF THE EMBODIMENTS

Figure 14:
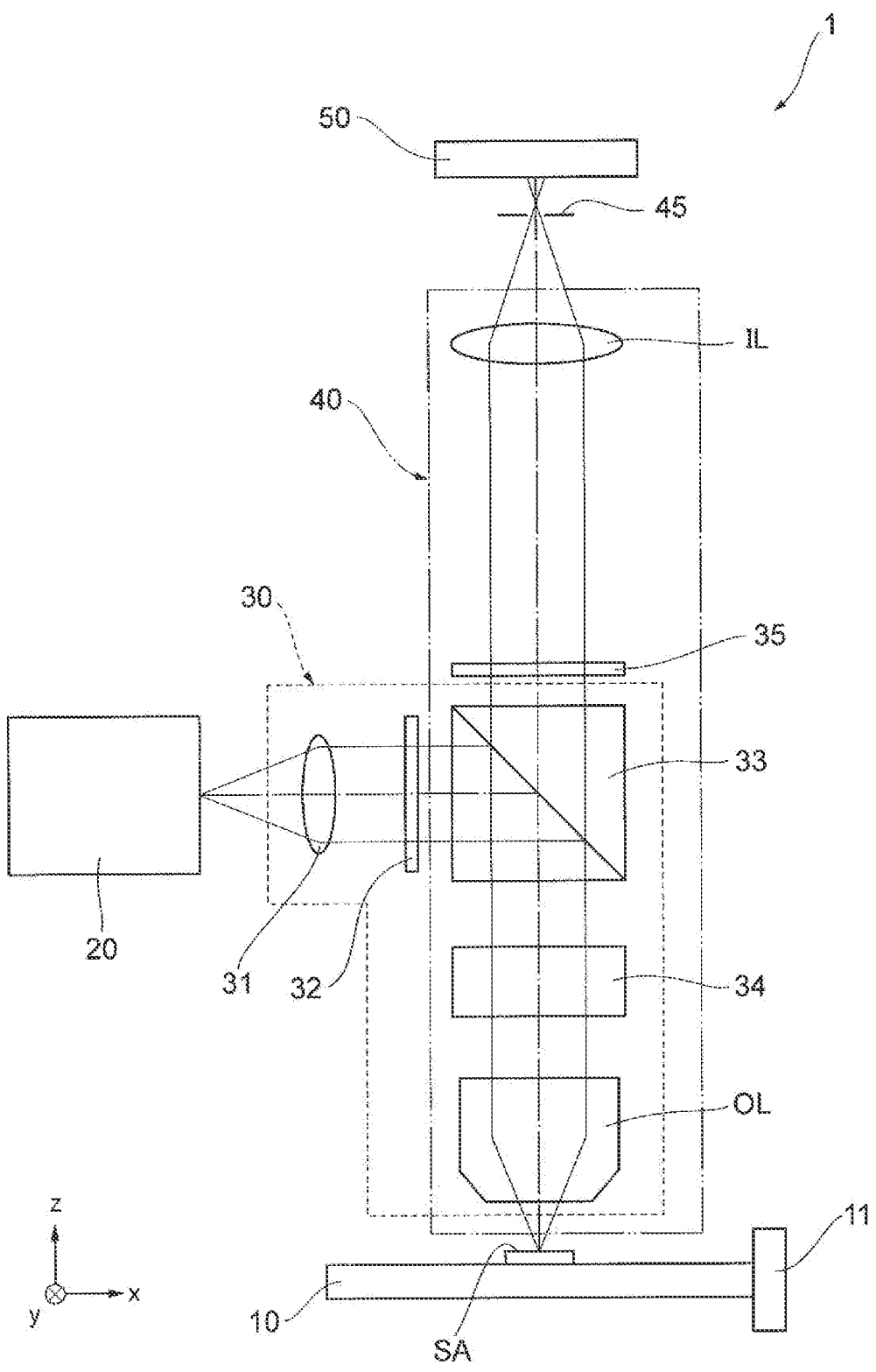
FIG. 14 is a schematic configuration diagram showing a confocal fluorescence microscope that is an example of a microscope device.

Hereinafter, preferable embodiments according to the present invention are described. First, a microscope optical system and a confocal fluorescence microscope (microscope device) that comprise a microscope objective lens according to each embodiment are described with reference to FIG. 14. As shown in FIG. 14, the confocal fluorescence microscope 1 includes a stage 10, a light source 20, an illumination optical system 30, a microscope optical system 40, and a detection part 50. In the following description, the coordinate axis extending in the optical axis direction of the microscope objective lens of the confocal fluorescence microscope 1 is assumed as the z-axis. Furthermore, coordinate axes extending in directions orthogonal to each other on a plane perpendicular to the z-axis are assumed as x-axis and y-axis.

For example, a sample SA held between a glass slide (not shown) and a cover slip (not shown) is mounted on the stage 10. Alternatively, a sample SA contained with immersion liquid in a sample vessel (not shown) may be mounted on the stage 10. The sample SA contains a fluorescent material, such as a fluorescent dye. The sample SA is, for example, fluorescently preliminarily stained cells or the like. A stage drive part 11 is provided adjacent to the stage 10. The stage drive part 11 moves the stage 10 along the z-axis.

The light source 20 generates excitation light in a predetermined wavelength band. For example, a laser light source or the like capable of emitting laser light (excitation light) in a predetermined wavelength band is adopted as the light source 20. The predetermined wavelength band is set in a wavelength band capable of exciting the sample SA that contains the fluorescent material. The excitation light emitted from the light source 20 enters the illumination optical system 30.

The illumination optical system 30 illuminates the sample SA on the stage 10 with excitation light emitted from the light source 20. The illumination optical system 30 includes, in order from the light source 20 to the sample SA: a collimating lens 31, a beam splitter 33, and a scanner 34. The illumination optical system 30 further includes a microscope objective lens OL of the microscope optical system 40. The collimating lens 31 transforms, into parallel light, the excitation light emitted from the light source 20.

The beam splitter 33 has characteristics that reflect the excitation light from the light source 20, and allow the fluorescence from the sample SA to pass. The beam splitter 33 reflects the excitation light from the light source 20, toward the sample SA on the stage 10. The beam splitter 33 allows the fluorescence generated by the sample SA to pass toward the detection part 50. An excitation filter 32 that allows the excitation light from the light source 20 to pass is arranged between the beam splitter 33 and the collimating lens 31. A fluorescent filter 35 that allows the fluorescence from the sample SA to pass is arranged between the beam splitter 33 and a second objective lens IL of the microscope optical system 40.

The scanner 34 scans the sample SA with the excitation light from the light source 20 in two directions that are the x direction and the y direction. For example, a Galvano scanner, a resonant scanner or the like is adopted as the scanner 34.

The microscope optical system 40 collects the fluorescence generated by the sample SA. The microscope optical system 40 includes, in order from the sample SA to the detection part 50: the microscope objective lens OL; and the second objective lens IL. The microscope optical system 40 further includes the scanner 34 and the beam splitter 33, which are disposed between the microscope objective lens OL and the second objective lens IL. The microscope objective lens OL is disposed above the stage 10, on which the sample SA is mounted, so as to face this stage 10. The microscope objective lens OL collects the excitation light from the light source 20, and irradiates the sample SA on the stage 10 with this light. The microscope objective lens OL receives the fluorescence caused by the sample SA, and transforms the light into parallel light. The second objective lens IL collects the fluorescence (parallel light) from the microscope objective lens OL.

The detection part 50 detects the fluorescence caused by the sample SA via the microscope optical system 40. A photoelectron multiplier is adopted as the detection part 50. A pinhole 45 is provided between the microscope optical system 40 and the detection part 50. The pinhole 45 is disposed at a position conjugate with the focal position of the microscope objective lens OL closer to the sample SA.

The pinhole 45 allows only light from the focal plane of the microscope objective lens OL (a plane that passes through the focal position of the microscope objective lens OL, and is perpendicular to the optical axis of the microscope objective lens OL) or from a plane that deviates in the optical axis direction from this focal plane within a predetermined acceptable range to pass, and blocks the other light.

In the confocal fluorescence microscope 1 having the configuration as described above, the excitation light emitted from the light source 20 passes through the collimating lens 31, and is transformed into parallel light. The excitation light having passed through the collimating lens 31 passes through the excitation filter 32, and enters the beam splitter 33. The excitation light incident on the beam splitter 33 is reflected by the beam splitter 33, and enters the scanner 34. The scanner 34 scans the sample SA with the excitation light having entered the scanner 34 in the two directions that are the x direction and the y direction. The excitation light having entered the scanner 34 passes through this scanner 34, passes through the microscope objective lens OL, and is collected on the focal plane of the microscope objective lens OL. A portion of the sample SA where the excitation light is collected (i.e., a portion on which the focal plane of the microscope objective lens OL is overlaid) is two-dimensionally scanned by the scanner 34 in the two directions that are the x direction and the y direction. The illumination optical system 30 thus illuminates the sample SA on the stage 10 with excitation light emitted from the light source 20.

By irradiation with the excitation light, the fluorescent material contained in the sample SA is excited, and fluorescence is emitted. The fluorescence from the sample SA passes through the microscope objective lens OL, and is thus transformed into parallel light. The fluorescence having passed through the microscope objective lens OL passes through the scanner 34, and enters the beam splitter 33. The fluorescence incident on the beam splitter 33 passes through this beam splitter 33, and reaches the fluorescent filter 35. The fluorescence having reached the fluorescent filter 35 passes through the fluorescent filter 35 and then through the second objective lens IL, and is collected at the position conjugate with the focal position of the microscope objective lens OL. The fluorescence collected at the position conjugate with the focal position of the microscope objective lens OL passes through the pinhole 45, and enters the detection part 50.

The detection part 50 photoelectrically converts the light (fluorescence) having entered this detection part 50, and generates data corresponding to the illumination of the light (luminance), as a detected signal of the light. The detection part 50 outputs the generated data to a control part, not shown. Note that the control part performs a process of adopting the data input from the detection part 50 as a data item for one pixel, and arranging each item in synchronization with two-dimensional scanning by the scanner 34, thus generating one image data item where data items for multiple pixels are two-dimensionally arranged (in two directions). As described above, the control part can obtain the image of the sample SA.

Although the confocal fluorescence microscope 1 has been described as the example of the microscope device according to the present embodiment, there is no limitation to this. For example, the microscope device according to the present embodiment may be a confocal microscope, a multiphoton excitation microscope, a super-resolution microscope or the like. The confocal fluorescence microscope 1 may be an upright microscope or an inverted microscope.

Figure 1:
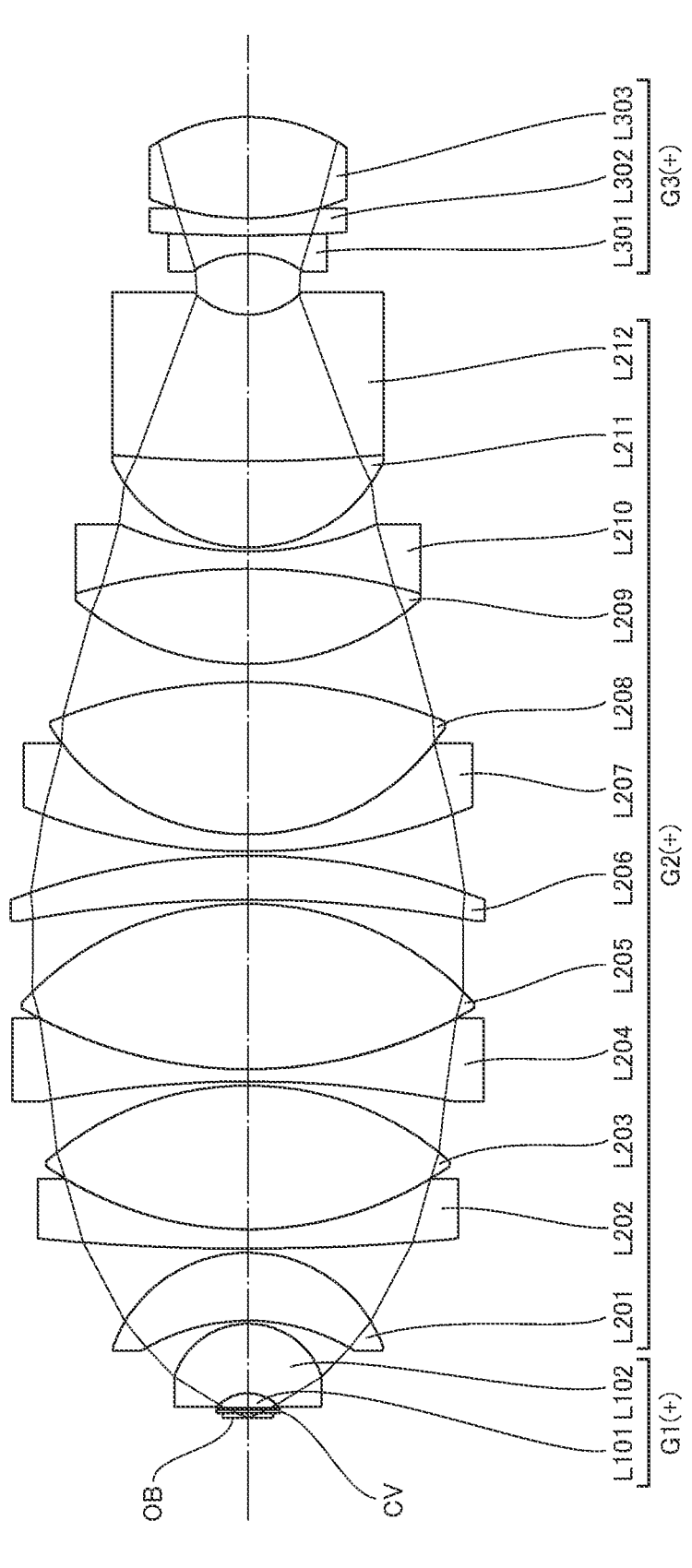
FIG. 1 is a sectional view showing a configuration of a microscope objective lens according to a First Example.

Next, a microscope objective lens according to a first embodiment is described. As an example of the microscope objective lens OL according to the first embodiment, a microscope objective lens OL(1) shown in FIG. 1 consists of, in order from an object on an optical axis: a first lens group G1 having a positive refractive power; a second lens group G2 having a concave surface facing an image; and a third lens group G3 having a concave surface facing the object. The first lens group G1 consists of one lens component having a positive refractive power. The third lens group G3 consists of three or more lenses that include two negative lenses, and one positive lens. Note that in each embodiment, each lens component indicates a single lens, or a cemented lens. In FIG. 1 and the like, an object OB indicates an object surface.

In the configuration described above, at least one predetermined negative lens (L302) in the two negative lenses of the third lens group G3 satisfies the following Conditional Expression (1), $$\nu_{dA} < 40 \qquad (1)$$

where vdA: an Abbe number of the predetermined negative lens of the third lens group G3.

According to the first embodiment, the microscope objective lens where various aberrations including the chromatic aberration of magnification have been favorably corrected, and the microscope optical system and the microscope device that comprise the microscope objective lens, can be achieved. The microscope objective lens OL according to the first embodiment may be an optical system OL(2) shown in FIG. 5, or an optical system OL(3) shown in FIG. 9.

Conditional Expression (1) defines an appropriate range of the Abbe number of the predetermined negative lens of the third lens group G3. By satisfying the Conditional Expression (1) in correction of the chromatic aberration of magnification, the primary achromatization can be favorably performed.

If the corresponding value of Conditional Expression (1) exceeds the upper limit value, it is difficult to correct the chromatic aberration of magnification. It is possible to further secure the advantageous effect of the present embodiment by setting the upper limit value of the Conditional Expression (1) to 35, 33, 32, or 30.

Preferably, in the microscope objective lens OL according to the first embodiment, the predetermined negative lens of the third lens group G3 is one negative lens in the two negative lenses of the third lens group G3, and the following Conditional Expressions (2) and (3) are satisfied, $$0 < \nu_{dX} - \nu_{dA} \qquad (2)$$

$$0 < (\theta A - \theta X)/(\nu_{dA} - \nu_{dX}) \times (\nu_{dP} - \nu_{dX}) + \theta X - \theta P \qquad (3)$$

where vdX: an Abbe number of another negative lens in the two negative lenses of the third lens group G3, vdP: an Abbe number of the positive lens of the third lens group G3, and θA: a partial dispersion ratio of the predetermined negative lens of the third lens group G3, defined by the following expression assuming that a refractive index of the predetermined negative lens for g-line is ngA, a refractive index of the predetermined negative lens for F-line is nFA, and a refractive index of the predetermined negative lens for C-line is nCA, $$\theta A = (ngA - nFA)/(nFA - nCA)$$

where θX: a partial dispersion ratio of the other negative lens of the third lens group G3, defined by the following expression assuming that a refractive index of the other negative lens for g-line is ngX, a refractive index of the other negative lens for F-line is nFX, and a refractive index of the other negative lens for C-line is nCX, $$\theta X = (ngX - nFX)/(nFX - nCX)$$

where θP: a partial dispersion ratio of the positive lens of the third lens group G3, defined by the following expression assuming that a refractive index of the positive lens for g-line is ngP, a refractive index of the positive lens for F-line is nFP, and a refractive index of the positive lens for C-line is nCP, $$\theta P = (ngP - nFP)/(nFP - nCP).$$

The Conditional Expression (2) defines an appropriate relationship between the Abbe number of the predetermined negative lens and the Abbe number of the other negative lens in the third lens group G3. The Conditional Expression (3) defines appropriate relationships between the partial dispersion ratio and the Abbe number of the predetermined negative lens, between the partial dispersion ratio and the Abbe number of the other negative lens, and between the partial dispersion ratio and the Abbe number of the positive lens, in the third lens group G3. By satisfying the Conditional Expressions (2) and (3) in correction of the chromatic aberration of magnification, in addition to the primary achromatization, the secondary spectrum can be favorably corrected.

If the corresponding value of Conditional Expression (2) falls below the lower limit value, it is difficult to correct the chromatic aberration of magnification. It is possible to further secure the advantageous effect of the present embodiment by setting the lower limit value of Conditional Expression (2) to 3, 5, 8, or 10.

If the corresponding value of Conditional Expression (3) falls below the lower limit value, it is difficult to correct the chromatic aberration of magnification. It is possible to further secure the advantageous effect of the present embodiment by setting the lower limit value of Conditional Expression (3) to 0.01.

In the microscope objective lens OL according to the first embodiment, the predetermined negative lens of the third lens group G3 may be one negative lens in the two negative lenses of the third lens group G3, and the following Conditional Expressions (2) and (3) may be satisfied, $$0 < \nu_{dX} - \nu_{dA} \qquad (2)$$

$$0 < (\theta A - \theta X)/(\nu_{dA} - \nu_{dX}) \times (\nu_{dP} - \nu_{dX}) + \theta X - \theta P - 0.015 \qquad (4)$$

where vdX: an Abbe number of another negative lens in the two negative lenses of the third lens group G3, vdP: an Abbe number of the positive lens of the third lens group G3, and θA: a partial dispersion ratio of the predetermined negative lens of the third lens group G3, defined by the following expression assuming that a refractive index of the predetermined negative lens for g-line is ngA, a refractive index of the predetermined negative lens for F-line is nFA, and a refractive index of the predetermined negative lens for C-line is nCA, $$\theta A = (ngA - nFA)/(nFA - nCA)$$

where θX: a partial dispersion ratio of the other negative lens of the third lens group G3, defined by the following expression assuming that a refractive index of the other negative lens for g-line is ngX, a refractive index of the other negative lens for F-line is nFX, and a refractive index of the other negative lens for C-line is nCX, $$\theta X = (ngX - nFX)/(nFX - nCX) \qquad 5$$

where $\theta P$: a partial dispersion ratio of the positive lens of the third lens group G3, defined by the following expression assuming that a refractive index of the positive lens for g-line is ngP, a refractive index of the positive lens for F-line is nFP, and a refractive index of the positive lens for C-line is nCP, $$\theta P = (ngP - nFP)/(nFP - nCP).$$

As described above, the Conditional Expression (2) defines an appropriate relationship between the Abbe number of the predetermined negative lens and the Abbe number of the other negative lens in the third lens group G3. The Conditional Expression (4) defines appropriate relationships between the partial dispersion ratio and the Abbe number of the predetermined negative lens, between the partial dispersion ratio and the Abbe number of the other negative lens, and between the partial dispersion ratio and the Abbe number of the positive lens, in the third lens group G3. By satisfying the Conditional Expressions (2) and (4) in correction of the chromatic aberration of magnification, in addition to the primary achromatization, the secondary spectrum can be favorably corrected.

If the corresponding value of Conditional Expression (2) falls below the lower limit value, it is difficult to correct the chromatic aberration of magnification. It is possible to further secure the advantageous effect of the present embodiment by setting the lower limit value of Conditional Expression (2) to 3, 5, 8, or 10.

If the corresponding value of Conditional Expression (4) falls below the lower limit value, it is difficult to correct the chromatic aberration of magnification. It is possible to further secure the advantageous effect of the present embodiment by setting the lower limit value of Conditional Expression (4) to 0.001.

Preferably, in the microscope objective lens OL according to the first embodiment, the following Conditional Expression (5) is satisfied, $$0 < \theta A - (0.6438 - 0.001682 \times \nu dA + 0.007) \qquad (5)$$

where $\theta A$: a partial dispersion ratio of the predetermined negative lens of the third lens group G3, defined by the following expression assuming that a refractive index of the predetermined negative lens for g-line is ngA, a refractive index of the predetermined negative lens for F-line is nFA, and a refractive index of the predetermined negative lens for C-line is nCA, $$\theta A = (ngA - nFA)/(nFA - nCA).$$

The Conditional Expression (5) defines an appropriate relationship between the Abbe number and the partial dispersion ratio of the predetermined negative lens in the third lens group G3. By satisfying the Conditional Expression (5) in correction of the chromatic aberration of magnification, in addition to the primary achromatization, the secondary spectrum can be favorably corrected.

If the corresponding value of Conditional Expression (5) falls below the lower limit value, it is difficult to correct the chromatic aberration of magnification. It is possible to further secure the advantageous effect of the present embodiment by setting the lower limit value of Conditional Expression (5) to 0.01.

In the microscope objective lens OL according to the first embodiment, the following Conditional Expression (6) may be satisfied, $$0 < \theta A - (0.6438 - 0.001682 \times \nu dA + 0.017) \qquad (6)$$

where $\theta A$: a partial dispersion ratio of the predetermined negative lens of the third lens group G3, defined by the following expression assuming that a refractive index of the predetermined negative lens for g-line is ngA, a refractive index of the predetermined negative lens for F-line is nFA, and a refractive index of the predetermined negative lens for C-line is nCA, $$\theta A = (ngA - nFA)/(nFA - nCA).$$

The Conditional Expression (6) defines an appropriate relationship between the Abbe number and the partial dispersion ratio of the predetermined negative lens in the third lens group G3. By satisfying the Conditional Expression (6) in correction of the chromatic aberration of magnification, in addition to the primary achromatization, the secondary spectrum can be favorably corrected.

If the corresponding value of Conditional Expression (6) falls below the lower limit value, it is difficult to correct the chromatic aberration of magnification. It is possible to further secure the advantageous effect of the present embodiment by setting the lower limit value of Conditional Expression (6) to 0.005.

Preferably, in the microscope objective lens OL according to the first embodiment, the predetermined negative lens of the third lens group G3 is one negative lens in the two negative lenses of the third lens group G3, and the other negative lens in the two negative lenses is disposed closer to the object than the predetermined negative lens, and closest to the object in the third lens group G3. Accordingly, the off-axial coma aberration can be favorably corrected.

Preferably, in the microscope objective lens OL according to the first embodiment, the following Conditional Expression (7) is satisfied, $$1.68 < ndX \qquad (7)$$

where ndX: a refractive index of the other negative lens of the third lens group G3 for d-line.

The Conditional Expression (7) defines an appropriate range of the refractive index of the other negative lens of the third lens group G3 for d-line. By satisfying the Conditional Expression (7), the off-axial coma aberration can be favorably corrected.

If the corresponding value of Conditional Expression (7) falls below the lower limit value, it is difficult to correct the off-axial coma aberration. It is possible to further secure the advantageous effect of the present embodiment by setting the lower limit value of Conditional Expression (7) to 1.69.

Preferably, in the microscope objective lens OL according to the first embodiment, the second lens group G2 has a positive refractive power. Accordingly, the spherical aberration, and the longitudinal chromatic aberration can be favorably corrected.

Preferably, in the microscope objective lens OL according to the first embodiment, the second lens group G2 includes a predetermined positive lens that satisfies the following Conditional Expression (8), $$\nu d2P < 35 \qquad (8)$$

where $\nu d2P$: an Abbe number of the predetermined positive lens of the second lens group G2.

The Conditional Expression (8) defines an appropriate range of the Abbe number of the predetermined positive lens of the second lens group G2. Note that in each embodiment, it is preferable that the predetermined positive lens be a glass lens. By satisfying the Conditional Expression (8), the longitudinal chromatic aberration can be favorably corrected.

If the corresponding value of Conditional Expression (8) exceeds the upper limit value, it is difficult to correct the longitudinal chromatic aberration. It is possible to further secure the advantageous effect of the present embodiment by setting the upper limit value of Conditional Expression (8) to 33, or 30.

Preferably, in the microscope objective lens OL according to the first embodiment, the second lens group G2 includes a predetermined positive lens through which a ray most distant from the optical axis in the second lens group G2 passes and which satisfies the following Conditional Expressions (8) and (9), $$\nu_{d2P} < 35 \tag{8}$$

$$0 < \theta 2P - (0.6438 - 0.001682 \times \nu_{d2P} + 0.008) \tag{9}$$

where $\nu$d2P: an Abbe number of the predetermined positive lens of the second lens group G2, and $\theta$2P: a partial dispersion ratio of the predetermined positive lens of the second lens group G2, defined by the following expression assuming that a refractive index of the predetermined positive lens for g-line is ng2P, a refractive index of the predetermined positive lens for F-line is nF2P, and a refractive index of the predetermined positive lens for C-line is nC2P, $$\theta 2P = (ng2P - nF2P)/(nF2P - nC2P).$$

As described above, the Conditional Expression (8) defines an appropriate range of the Abbe number of the predetermined positive lens of the second lens group G2. The Conditional Expression (9) defines an appropriate relationship between the Abbe number and the partial dispersion ratio of the predetermined positive lens in the second lens group G2. By satisfying the Conditional Expressions (8) and (9) in correction of the longitudinal chromatic aberration, in addition to the primary achromatization, the secondary spectrum can be favorably corrected.

If the corresponding value of Conditional Expression (8) exceeds the upper limit value, it is difficult to correct the longitudinal chromatic aberration. It is possible to further secure the advantageous effect of the present embodiment by setting the upper limit value of Conditional Expression (8) to 33, or 30.

If the corresponding value of Conditional Expression (9) falls below the lower limit value, it is difficult to correct the longitudinal chromatic aberration. It is possible to further secure the advantageous effect of the present embodiment by setting the lower limit value of Conditional Expression (9) to 0.001.

In the microscope objective lens OL according to the first embodiment, the second lens group G2 may include a positive lens through which a ray most distant from the optical axis in the second lens group G2 passes, and a predetermined positive lens disposed closer to the object than the positive lens through which the ray most distant from the optical axis passes, the predetermined positive lens satisfying the following Conditional Expressions (8) and (9), $$\nu_{d2P} < 35 \tag{8}$$

$$0 < \theta 2P - (0.6438 - 0.001682 \times \nu_{d2P} + 0.008) \tag{9}$$

where $\nu$d2P: an Abbe number of the predetermined positive lens of the second lens group G2, and $\theta$2P: a partial dispersion ratio of the predetermined positive lens of the second lens group G2, defined by the following expression assuming that a refractive index of the predetermined positive lens for g-line is ng2P, a refractive index of the predetermined positive lens for F-line is nF2P, and a refractive index of the predetermined positive lens for C-line is nC2P, $$\theta 2P = (ng2P - nF2P)/(nF2P - nC2P).$$

As described above, the Conditional Expression (8) defines an appropriate range of the Abbe number of the predetermined positive lens of the second lens group G2. As described above, the Conditional Expression (9) defines an appropriate relationship between the Abbe number and the partial dispersion ratio of the predetermined positive lens in the second lens group G2. By satisfying the Conditional Expressions (8) and (9) in correction of the longitudinal chromatic aberration, in addition to the primary achromatization, the secondary spectrum can be favorably corrected.

If the corresponding value of Conditional Expression (8) exceeds the upper limit value, it is difficult to correct the longitudinal chromatic aberration. It is possible to further secure the advantageous effect of the present embodiment by setting the upper limit value of Conditional Expression (8) to 33, or 30.

If the corresponding value of Conditional Expression (9) falls below the lower limit value, it is difficult to correct the longitudinal chromatic aberration. It is possible to further secure the advantageous effect of the present embodiment by setting the lower limit value of Conditional Expression (9) to 0.001.

In the microscope objective lens OL according to the first embodiment, the second lens group G2 may include a positive lens through which a ray most distant from the optical axis in the second lens group G2 passes, and a predetermined positive lens disposed closer to an image than the positive lens through which the ray most distant from the optical axis passes, the predetermined positive lens satisfying the following Conditional Expressions (8) and (9), $$\nu_{d2P} < 35 \tag{8}$$

$$0 < \theta 2P - (0.6438 - 0.001682 \times \nu_{d2P} + 0.008) \tag{9}$$

where $\nu$d2P: an Abbe number of the predetermined positive lens of the second lens group G2, and $\theta$2P: a partial dispersion ratio of the predetermined positive lens of the second lens group G2, defined by the following expression assuming that a refractive index of the predetermined positive lens for g-line is ng2P, a refractive index of the predetermined positive lens for F-line is nF2P, and a refractive index of the predetermined positive lens for C-line is nC2P, $$\theta 2P = (ng2P - nF2P)/(nF2P - nC2P).$$

As described above, the Conditional Expression (8) defines an appropriate range of the Abbe number of the predetermined positive lens of the second lens group G2. As described above, the Conditional Expression (9) defines an appropriate relationship between the Abbe number and the partial dispersion ratio of the predetermined positive lens in the second lens group G2. By satisfying the Conditional Expressions (8) and (9) in correction of the longitudinal chromatic aberration, in addition to the primary achromatization, the secondary spectrum can be favorably corrected.

If the corresponding value of Conditional Expression (8) exceeds the upper limit value, it is difficult to correct the longitudinal chromatic aberration. It is possible to further secure the advantageous effect of the present embodiment by setting the upper limit value of Conditional Expression (8) to 33, or 30.

If the corresponding value of Conditional Expression (9) falls below the lower limit value, it is difficult to correct the longitudinal chromatic aberration. It is possible to further secure the advantageous effect of the present embodiment by setting the lower limit value of Conditional Expression (9) to 0.001.

Preferably, in the microscope objective lens OL according to the first embodiment, the lens component of the first lens group G1 is a cemented lens that includes a plano-convex-shaped positive lens having a planar surface facing the object. Accordingly, the curvature of field can be favorably corrected. Note that the lens component of the first lens group G1 is not necessarily a cemented lens, and may be a single lens instead.

Next, a microscope objective lens according to a second embodiment is described. Since the microscope objective lens according to the second embodiment has a configuration similar to that of the microscope objective lens OL according to the first embodiment, the same symbols as those in the first embodiment are assigned and description is made. As an example of the microscope objective lens OL according to the second embodiment, a microscope objective lens OL(1) shown in FIG. 1 consists of, in order from an object on an optical axis: a first lens group G1 having a positive refractive power; a second lens group G2 having a concave surface facing an image; and a third lens group G3 having a concave surface facing the object. The first lens group G1 consists of one lens component having a positive refractive power.

In the configuration described above, the second lens group G2 includes a predetermined positive lens that satisfies the following Conditional Expressions (8) and (9), $$\nu_{d2P} < 35 \tag{8}$$

$$0 < \theta2P - (0.6438 - 0.001682 \times \nu_{d2P} + 0.008) \tag{9}$$

where $\nu$d2P: an Abbe number of the predetermined positive lens of the second lens group G2, and $\theta$2P: a partial dispersion ratio of the predetermined positive lens of the second lens group G2, defined by the following expression assuming that a refractive index of the predetermined positive lens for g-line is ng2P, a refractive index of the predetermined positive lens for F-line is nF2P, and a refractive index of the predetermined positive lens for C-line is nC2P, $$\theta2P = (ng2P - nF2P)/(nF2P - nC2P).$$

According to the second embodiment, the microscope objective lens where various aberrations including the chromatic aberration of magnification have been favorably corrected, and the microscope optical system and the microscope device that comprise the microscope objective lens, can be achieved. The microscope objective lens OL according to the second embodiment may be an optical system OL(2) shown in FIG. 5, or an optical system OL(3) shown in FIG. 9.

As described above, the Conditional Expression (8) defines an appropriate range of the Abbe number of the predetermined positive lens of the second lens group G2. As described above, the Conditional Expression (9) defines an appropriate relationship between the Abbe number and the partial dispersion ratio of the predetermined positive lens in the second lens group G2. By satisfying the Conditional Expressions (8) and (9) in correction of the longitudinal chromatic aberration, in addition to the primary achromatization, the secondary spectrum can be favorably corrected.

If the corresponding value of Conditional Expression (8) exceeds the upper limit value, it is difficult to correct the longitudinal chromatic aberration. It is possible to further secure the advantageous effect of the present embodiment by setting the upper limit value of Conditional Expression (8) to 33, or 30.

If the corresponding value of Conditional Expression (9) falls below the lower limit value, it is difficult to correct the longitudinal chromatic aberration. It is possible to further secure the advantageous effect of the present embodiment by setting the lower limit value of Conditional Expression (9) to 0.001.

Preferably, in the microscope objective lens OL according to the second embodiment, the third lens group G3 includes two negative lenses, and at least one predetermined negative lens in the two negative lenses satisfies the following Conditional Expression (1). Similar to the case of the first embodiment, by satisfying the Conditional Expression (1) in correction of the chromatic aberration of magnification, the primary achromatization can be favorably performed. Moreover, it is possible to further secure the advantageous effect of the present embodiment by setting the upper limit value of Conditional Expression (1) to 35, 33, 32, or 30.

Preferably, in the microscope objective lens OL according to the second embodiment, the third lens group G3 consists of three or more lenses that include two negative lenses and one positive lens, wherein a predetermined negative lens satisfying the Conditional Expression (1) and the like described above is one in the two negative lenses of the third lens group G3, and satisfies the Conditional Expressions (2) and (3) described above. Similar to the case of the first embodiment, by satisfying the Conditional Expressions (2) and (3) in correction of the chromatic aberration of magnification, in addition to the primary achromatization, the secondary spectrum can be favorably corrected. Moreover, it is possible to further secure the advantageous effect of the present embodiment by setting the lower limit value of Conditional Expression (2) to 3, 5, 8, or 10. It is possible to further secure the advantageous effect of the present embodiment by setting the lower limit value of Conditional Expression (3) to 0.01.

In the microscope objective lens OL according to the second embodiment, the third lens group G3 may consist of three or more lenses that include two negative lenses and one positive lens, wherein a predetermined negative lens satisfying the Conditional Expression (1) and the like described above may be one in the two negative lenses of the third lens group G3, and satisfies the Conditional Expressions (2) and (4) described above. Similar to the case of the first embodiment, by satisfying the Conditional Expressions (2) and (4) in correction of the chromatic aberration of magnification, in addition to the primary achromatization, the secondary spectrum can be favorably corrected. Moreover, it is possible to further secure the advantageous effect of the present embodiment by setting the lower limit value of Conditional Expression (2) to 3, 5, 8, or 10. It is possible to further secure the advantageous effect of the present embodiment by setting the lower limit value of Conditional Expression (4) to 0.01.

Preferably, in the microscope objective lens OL according to the second embodiment, the third lens group G3 includes two negative lenses, and at least one predetermined negative lens in the two negative lenses satisfies the following Conditional Expression (5). Similar to the case of the first embodiment, by satisfying the Conditional Expression (5) in correction of the chromatic aberration of magnification, in addition to the primary achromatization, the secondary spectrum can be favorably corrected. It is possible to further secure the advantageous effect of the present embodiment by setting the lower limit value of Conditional Expression (5) to 0.01.

In the microscope objective lens OL according to the second embodiment, the third lens group G3 may include two negative lenses, and at least one predetermined negative lens in the two negative lenses satisfies the following Conditional Expression (6). Similar to the case of the first embodiment, by satisfying the Conditional Expression (6) in correction of the chromatic aberration of magnification, in addition to the primary achromatization, the secondary spectrum can be favorably corrected. It is possible to further secure the advantageous effect of the present embodiment by setting the lower limit value of Conditional Expression (6) to 0.005.

Preferably, in the microscope objective lens OL according to the second embodiment, the third lens group G3 includes two negative lenses, the predetermined negative lens satisfying the Conditional Expression (1) described above is one negative lens in the two negative lenses of the third lens group G3, and the other negative lens in the two negative lenses is disposed closer to the object than the predetermined negative lens, and closest to the object in the third lens group G3. Accordingly, the off-axial coma aberration can be favorably corrected.

Preferably, in the microscope objective lens OL according to the second embodiment, the Conditional Expression (7) described above is satisfied. Similar to the case of the first embodiment, by satisfying the Conditional Expression (7), the off-axial coma aberration can be favorably corrected. It is possible to further secure the advantageous effect of the present embodiment by setting the lower limit value of Conditional Expression (7) to 1.69.

Preferably, in the microscope objective lens OL according to the second embodiment, the second lens group G2 has a positive refractive power. Accordingly, the spherical aberration, and the longitudinal chromatic aberration can be favorably corrected.

Preferably, in the microscope objective lens OL according to the second embodiment, the lens component of the first lens group G1 is a cemented lens that includes a plano-convex-shaped positive lens having a planar surface facing the object. Accordingly, the curvature of field can be favorably corrected. Note that the lens component of the first lens group G1 is not necessarily a cemented lens, and may be a single lens instead.

EXAMPLES

Figure 5:
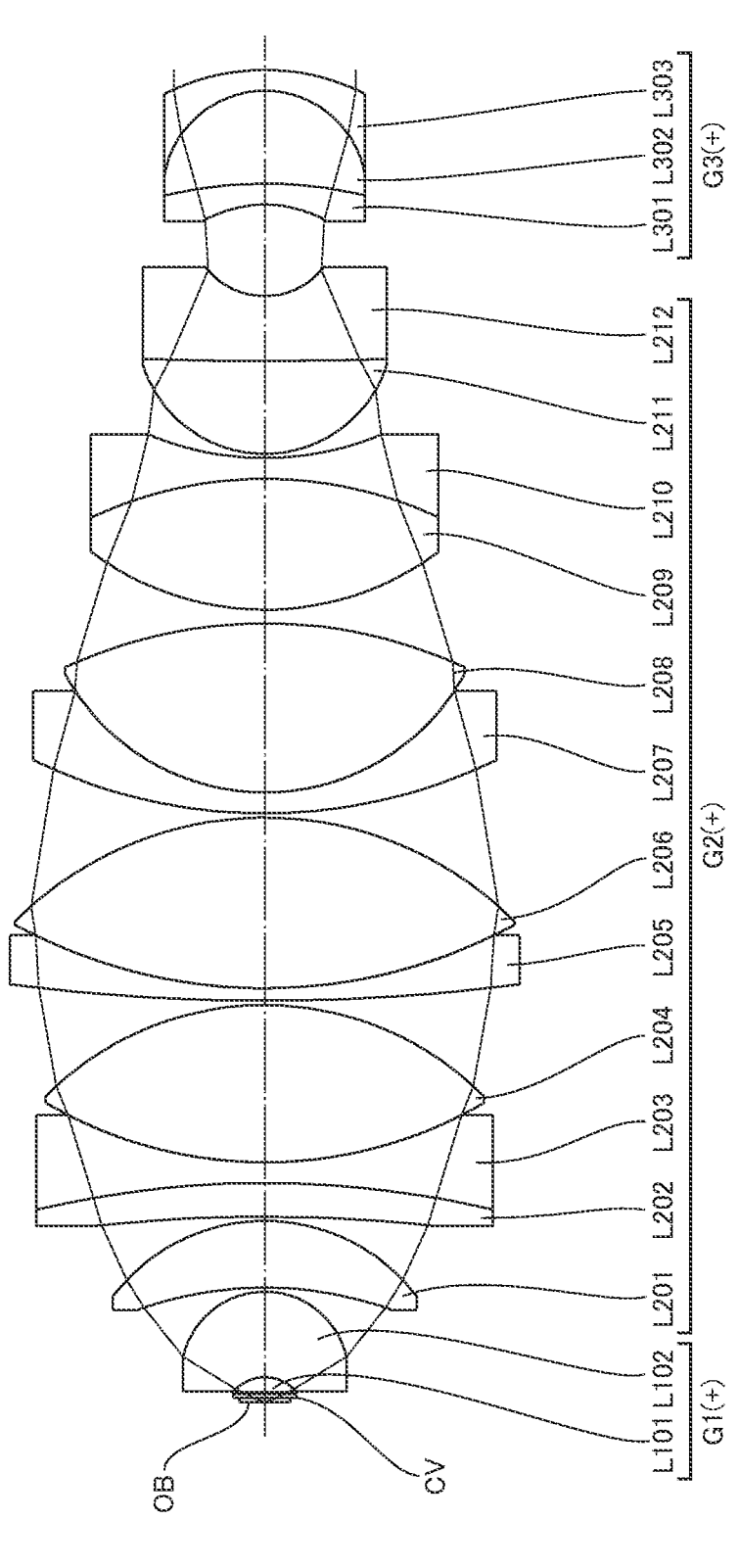
FIG. 5 is a sectional view showing a configuration of a microscope objective lens according to a Second Example.
Figure 9:
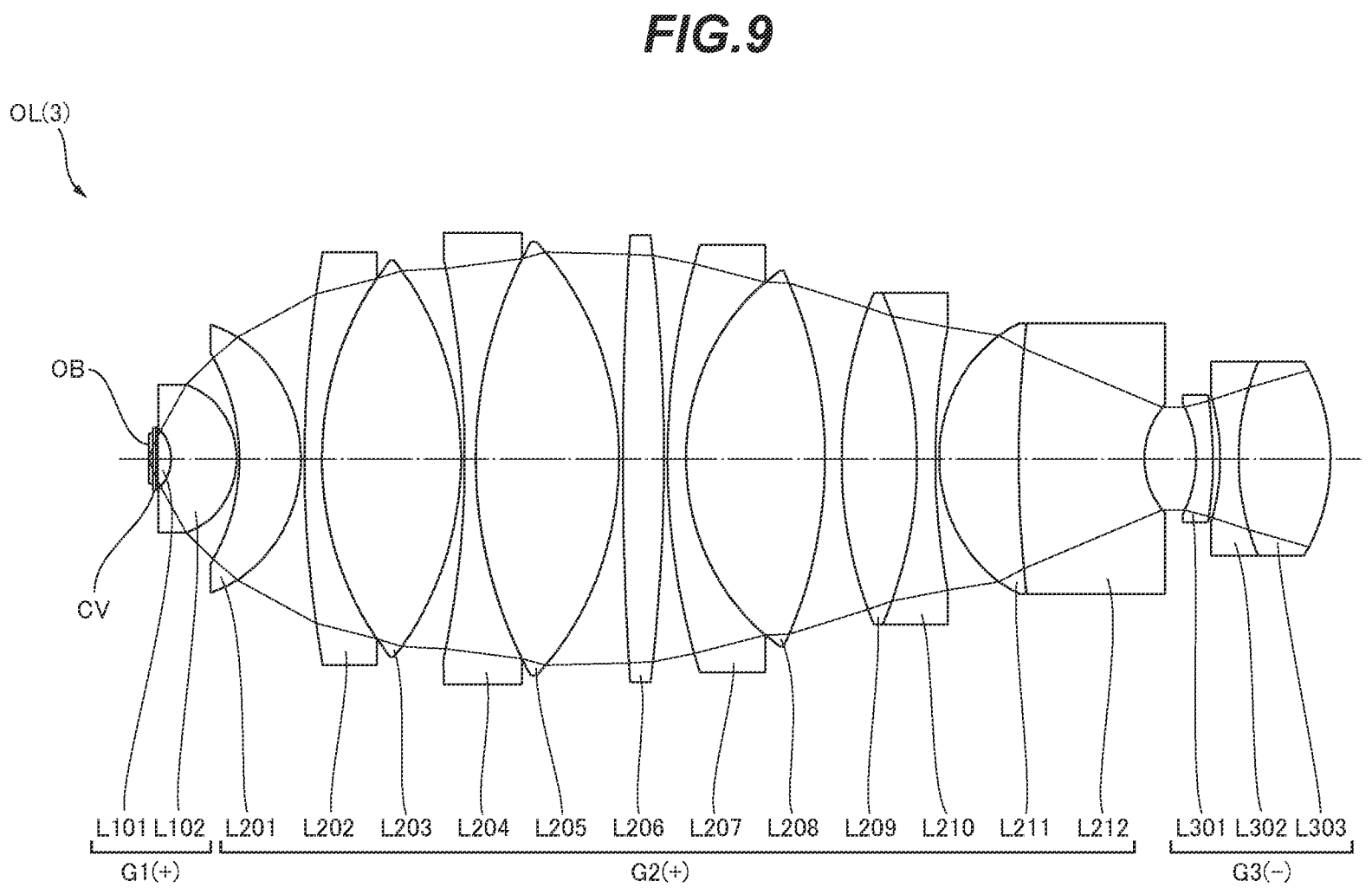

Hereinafter, Examples of the microscope objective lenses OL according to each embodiment are described with reference to the drawings. FIGS. 1, 5, and 9 are optical path diagrams showing the configurations of microscope objective lenses OL {OL(1) to OL(3)}according to First to Third Examples. In these FIGS. 1, 5, and 9, each lens group is represented by a combination of a symbol G and a numeral (or an alphabet letter), and each lens is represented by a combination of a symbol L and a numeral (or an alphabet letter). In this case, to prevent complication due to increase in the types and numbers of symbols and numerals, the lenses and the like are represented using the combinations of symbols and numerals independently with respect to each Example. Accordingly, even when the same combination of a symbol and a numeral is used among Examples, such usage does not necessarily mean the same configuration.

Tables 1 to 3 are hereinafter shown, and among these tables, Table 1 is a table showing each data item in the First Example, Table 2 is that in the Second Example, and Table 3 is that in the Third Example. In each Example, for calculation of aberration characteristics, d-line (wavelength $\lambda=587.6$ nm), C-line (wavelength $\lambda=656.3$ nm), and F-line (wavelength $\lambda=486.1$ nm) are selected.

In the table of [General Data], $\beta$ indicates the magnification of the microscope objective lens. f indicates the focal length of the microscope objective lens. NA indicates the object-side numerical aperture of the microscope objective lens. WD stands for the working distance, and indicates the distance on the optical axis from the object (with the thickness of the cover slip being eliminated) to the lens surface (a first surface described later) that is in the microscope objective lens and is closest to the object. $\nu dA$ indicates the Abbe number of the predetermined negative lens of the third lens group. $\theta A$ indicates the partial dispersion ratio of the predetermined negative lens of the third lens group. $\nu dX$ indicates the Abbe number of the other negative lens of the third lens group. $\theta X$ indicates the partial dispersion ratio of the other negative lens of the third lens group. $\nu dP$ indicates the Abbe number of the positive lens of the third lens group. $\theta P$ indicates the partial dispersion ratio of the positive lens of the third lens group. $\nu d2P$ indicates the Abbe number of the predetermined positive lens of the second lens group. $\theta 2P$ indicates the partial dispersion ratio of the predetermined positive lens of the second lens group.

In the table of [Lens Data], the surface number indicates the order of the lens surface from the object, R indicates the radius of curvature corresponding to each surface number (in a case of a lens surface having a convex surface facing the object, the value is assumed to be positive), D is the lens thickness or air distance on the optical axis corresponding to each surface number, nd indicates the refractive index of the optical material for d-line (wavelength $\lambda=587.6$ nm) corresponding to each surface number, $\nu d$ indicates the Abbe number corresponding to each surface number with reference to d-line of the optical material, and H indicates the distance between a ray most distant from the optical axis on the lens surface corresponding to each surface number, and the optical axis, and egF indicates the partial dispersion ratio of the material of the optical member corresponding to each surface number. "∞" of the radius of curvature indicates a plane or an aperture. The description of the air refractive index nd=1.00000 is omitted.

The refractive index of the material of the optical member for g-line (wavelength $\lambda=435.8$ nm) is assumed as ng, the refractive index of the material of the optical member for F-line (wavelength $\lambda=486.1$ nm) is assumed as nF, and the refractive index of the material of the optical member for C-line (wavelength $\lambda=656.3$ nm) is assumed as nC. In this case, the partial dispersion ratio $\theta gF$ of the material of the optical member is defined by the following Expression (A).

$$\theta gF=(ng-nF)/(nF-nC) \tag{A}$$

The table of [Lens Group Data] indicates the starting surface (the surface closest to the object) and the focal length of each lens group.

Hereinafter, for all the data values, the listed focal length f, radius of curvature R, surface distance D, other lengths and the like are generally represented in "mm" if not otherwise specified, but even after proportional scaling in or out is applied, the optical system can achieve equivalent optical performances; accordingly, the representation is not limited to this.

Since the descriptions of the tables so far are common to all the Examples, redundant descriptions are hereinafter omitted.

First Example

The First Example is described with reference to FIGS. 1 to 4 and Table 1. FIG. 1 is an optical path diagram showing the configuration of a microscope objective lens according to the First Example. The microscope objective lens OL(1) according to the First Example comprises, in order from an object on the optical axis: a first lens group G1 having a positive refractive power; a second lens group G2 that has a concave surface facing an image and has a positive refractive power; and a third lens group G3 that has a concave surface facing the object and has a positive refractive power. The gap between the distal end of the microscope objective lens OL(1) according to the First Example and a cover slip CV covering the object OB is filled with immersion liquid (oil). The gap between the cover slip CV and the object OB is filled with the immersion liquid (oil). Note that the refractive index of the immersion liquid for d-line (wavelength $\lambda$=587.6 nm) is assumed as 1.39847. The refractive index of the cover glass CV for d-line is assumed as 1.52439.

The first lens group G1 comprises, in order from object on the optical axis, a cemented lens that has a positive refractive power, and includes a plano-convex-shaped positive lens L101 having a planar surface facing the object, and a negative meniscus lens L102 having a concave surface facing the object, which are cemented to each other.

The second lens group G2 comprises, in order from the object on the optical axis: a positive meniscus lens L201 having a concave surface facing the object; a cemented lens that includes a negative meniscus lens L202 having a convex surface facing the object, and a biconvex positive lens L203, which are cemented to each other; a cemented lens that includes a biconcave negative lens L204, and a biconvex positive lens L205, which are cemented to each other; a positive meniscus lens L206 having a concave surface facing the object; a cemented lens that includes a negative meniscus lens L207 having a convex surface facing the object, and a biconvex positive lens L208, which are cemented to each other; a cemented lens that includes a biconvex positive lens L209, and a biconcave negative lens L210, which are cemented to each other; and a cemented lens that includes a positive meniscus lens L211 having a convex surface facing the object, and a negative meniscus lens L212 having a convex surface facing the object, which are cemented to each other. The positive meniscus lens L206 of the second lens group G2 corresponds to the aforementioned predetermined positive lens which is of the second lens group G2 and through which the ray most distant from the optical axis passes.

The third lens group G3 comprises, in order from the object on the optical axis, a cemented lens that includes a biconcave negative lens L301, a negative meniscus lens L302 having a convex surface facing the object and a biconvex positive lens L303, which are cemented to each other. The negative meniscus lens L302 of the third lens group G3 corresponds to the predetermined negative lens described above. The negative lens L301 of the third lens group G3 corresponds to the other negative lens described above. The positive lens L303 of the third lens group G3 corresponds to the positive lens described above.

Note that it is configured so that by moving at least three lens components (single lenses or cemented lenses) of the second lens group G2 on the optical axis, the air distances between the lens components of the second lens group G2 can be changed in accordance with the thickness of the cover slip CV. The lens component of the second lens group G2 movable on the optical axis functions as what is called a correction collar, and can correct an aberration that changes in accordance with the thickness of the cover slip CV.

The following Table 1 lists values of data on the microscope objective lens according to the First Example. Note that the first surface is an object surface (OB).

TABLE 1

| [General Data] | | | |
|---|---|---|---|
| $\beta$ = 60 times | | WD = 0.33 | |
| f = 3.34 | | $\theta$A = 0.6319 | |
| NA = 1.30 | | $\theta$X = 0.5603 | |
| vdA = 27.35 | | $\theta$P = 0.6017 | |
| vdX = 48.10 | | $\theta$2P = 0.6065 | |
| vdP = 29.84 | | | |
| vd2P = 28.69 | | | |

| [Lens Data] | | | | | | |
|---|---|---|---|---|---|---|
| Surface Number | R | D | nd | vd | H | $\theta$gF |
| 1 | ∞ | 0.23 | 1.39847 | 51.24 | | |
| 2 | ∞ | 0.17 | 1.52439 | 54.28 | | |
| 3 | ∞ | 0.10 | 1.39847 | 51.24 | | |
| 4 | ∞ | 0.70 | 1.45850 | 67.85 | | |
| 5 | −2.033 | 3.44 | 1.95375 | 32.33 | | |
| 6 | −3.746 | 0.15 | | | | |
| 7 | −9.727 | 3.36 | 1.49782 | 82.57 | 4.92 | |
| 8 | −6.923 | 0.20 | | | 5.96 | |
| 9 | 103.938 | 0.95 | 1.55298 | 55.07 | 7.98 | |
| 10 | 16.911 | 7.11 | 1.49782 | 82.57 | 8.85 | |
| 11 | −14.628 | 0.20 | | | 9.26 | |
| 12 | −50.850 | 0.60 | 1.67300 | 38.26 | 9.54 | |
| 13 | 21.429 | 8.17 | 1.43385 | 95.25 | 10.09 | |
| 14 | −14.740 | 0.20 | | | 10.45 | |
| 15 | −58.693 | 2.18 | 1.79504 | 28.69 | 10.41 | 0.6065 |
| 16 | −31.348 | 0.20 | | | 10.51 | |
| 17 | 27.743 | 0.85 | 1.74320 | 49.26 | 9.92 | |
| 18 | 11.280 | 7.53 | 1.43385 | 95.25 | 9.03 | |
| 19 | −24.461 | 0.90 | | | 8.96 | |
| 20 | 12.668 | 4.70 | 1.43425 | 94.77 | 7.59 | |
| 21 | −29.055 | 0.85 | 1.73211 | 46.18 | 7.07 | |
| 22 | 15.117 | 0.20 | | | 6.25 | |
| 23 | 7.224 | 4.26 | 1.43425 | 94.77 | 5.98 | |
| 24 | 68.128 | 7.24 | 1.85026 | 32.35 | 5.38 | |
| 25 | 3.610 | 3.01 | | | 2.47 | |
| 26 | −4.497 | 0.90 | 1.70000 | 48.10 | | 0.5603 |
| 27 | 74.320 | 0.85 | 1.66382 | 27.35 | | 0.6319 |
| 28 | 12.514 | 5.00 | 1.80000 | 29.84 | | 0.6017 |
| 29 | −8.336 | — | | | | |

| [Lens Group Data] | | |
|---|---|---|
| Group | First surface | Focal length |
| G1 | 4 | 8.32 |
| G2 | 7 | 4.34 |
| G3 | 26 | 159.75 |

Figure 2:
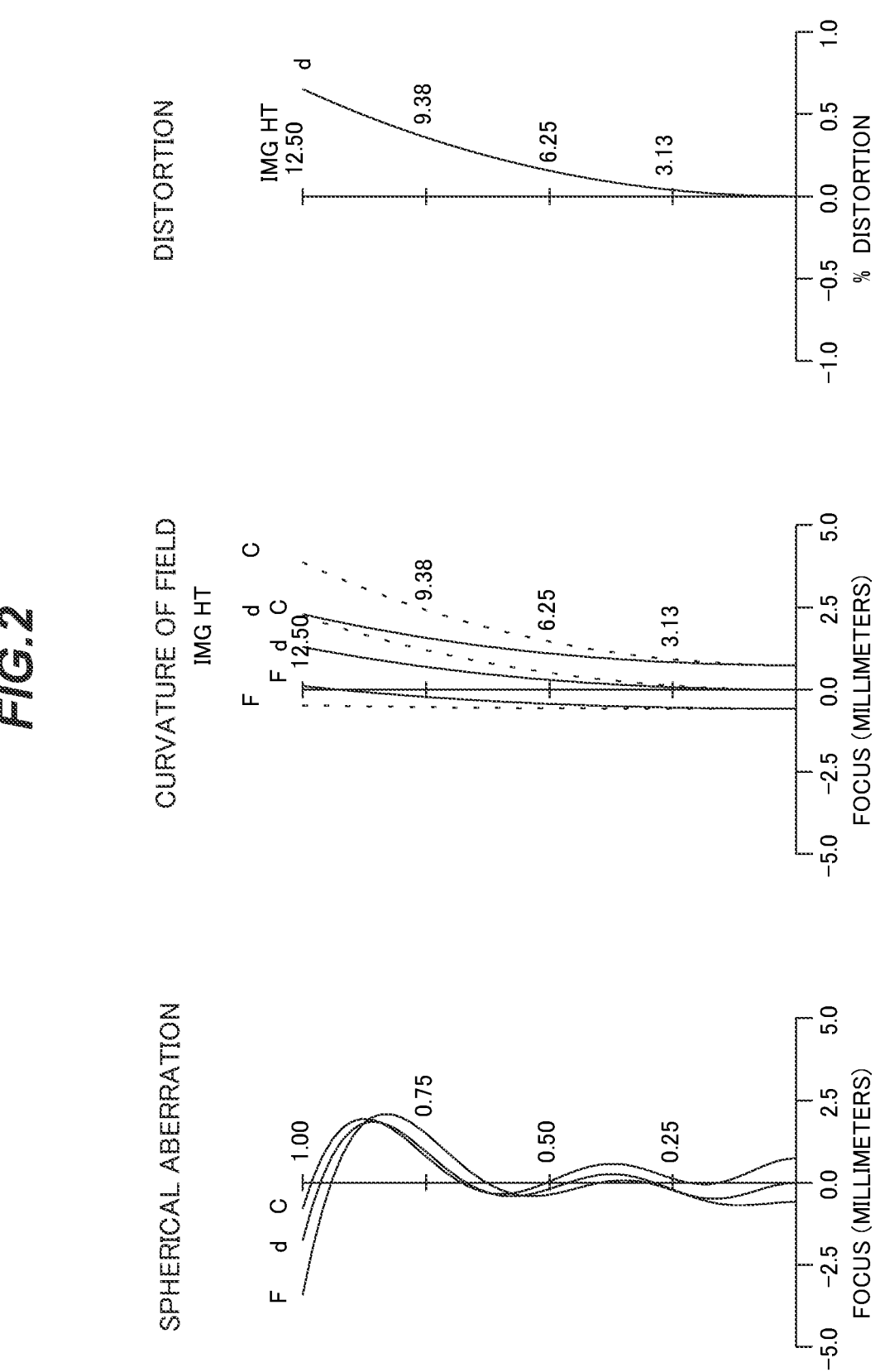
FIG. 2 depicts graphs showing various aberrations of the microscope objective lens according to the First Example.
Figure 3:
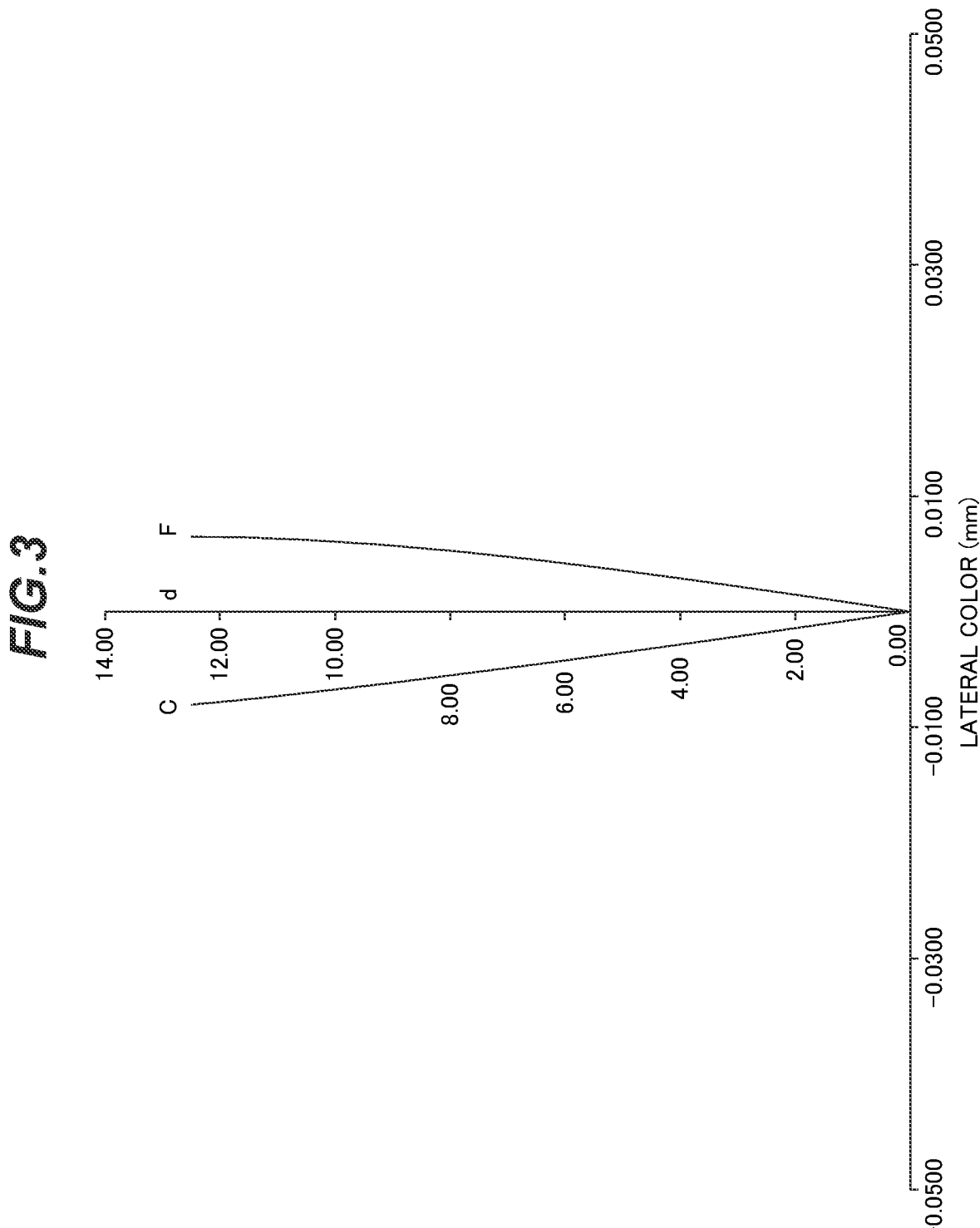
FIG. 3 depicts a chromatic aberration graph of the microscope objective lens according to the First Example.
Figure 4:
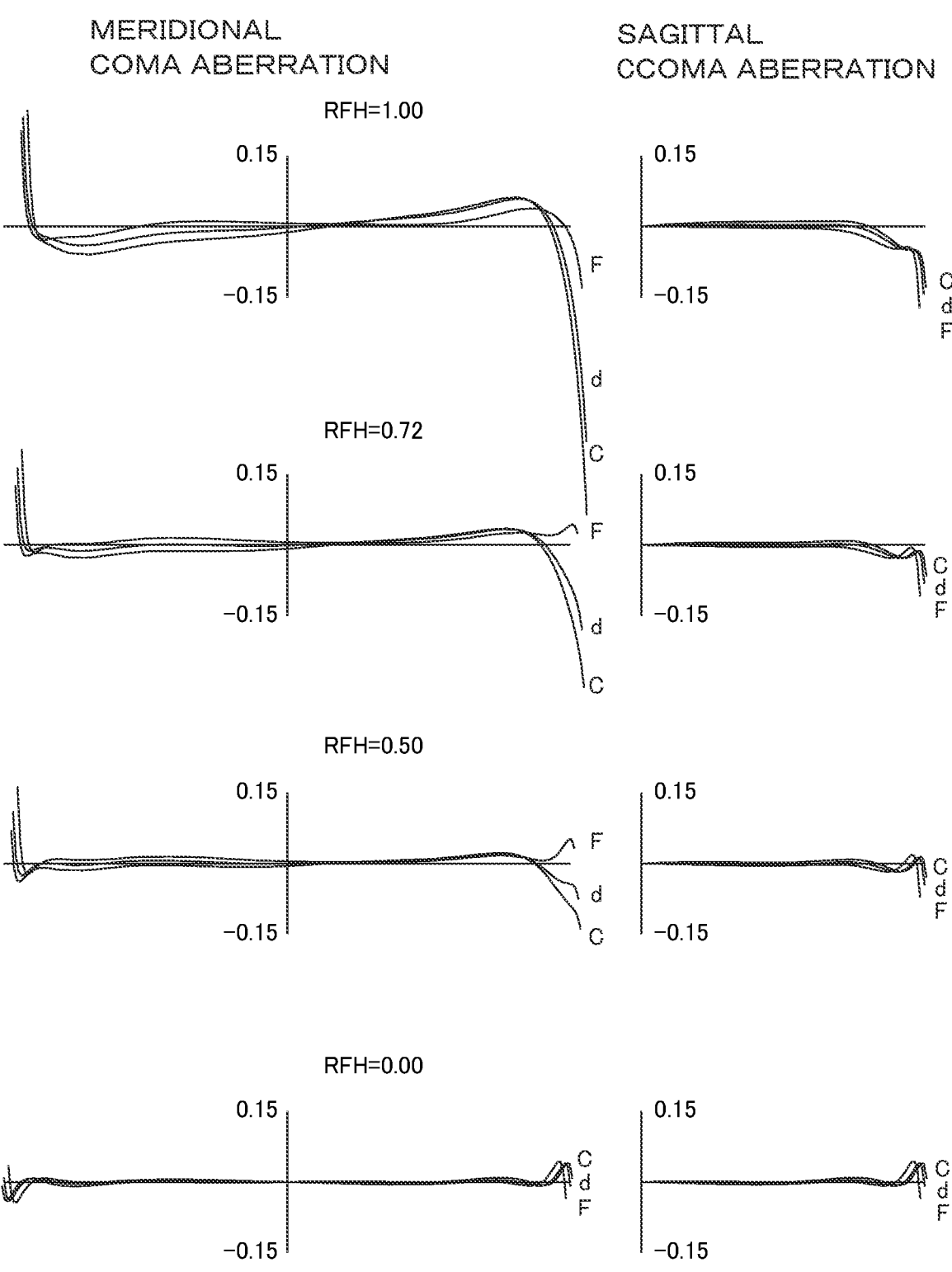
FIG. 4 depicts coma aberration graphs of the microscope objective lens according to the First Example.

FIG. 2 shows various aberrations (the spherical aberration, curvature of field, and distortion) of the microscope objective lens according to the First Example. FIG. 3 is a diagram showing chromatic aberrations of magnification (transverse chromatic aberrations) of the microscope objective lens according to the First Example. FIG. 4 shows coma aberrations (meridional and sagittal coma aberrations) of the microscope objective lens according to the First Example. Note that each aberration graph shows various aberrations in a state where the microscope objective lens is combined with a second objective lens. In the aberration graphs in FIGS. 2 to 4, d indicates various aberrations for d-line (wavelength $\lambda$=587.6 nm), C indicates those for C-line (wavelength $\lambda$=656.3 nm), and F indicates those for F-line (wavelength λ=486.1 nm). In the spherical aberration graph, the ordinate axis indicates the value normalized with the maximum value of the entrance pupil radius of one, and the abscissa axis indicates the value [mm] of the aberration for each ray. In the aberration graph showing the curvature of field, solid lines indicate the meridional image surfaces for the respective wavelengths, and broken lines indicate the sagittal image surfaces for the respective wavelengths. In the aberration graph showing the curvature of field, the ordinate axis indicates the image height [mm], and the abscissa axis indicates the value of aberration [mm]. In the distortion graph (distortion), the ordinate axis indicates the image height [mm], and the abscissa axis indicates the rate of the aberration by the percentage (% value). In the aberration graph showing the chromatic aberration of magnification, the ordinate axis indicates the image height [mm], and the abscissa axis indicates the value of aberration [mm]. Each coma aberration graph indicates the value of aberration with the relative field height (RFH) ranging from 0.00 to 1.00. Also in the aberration graphs in the following Examples, symbols similar to those in this Example are used, and redundant description is omitted.

Each aberration graph shows that the microscope objective lens according to the First Example has favorably corrected various aberrations including the chromatic aberration of magnification, and has an excellent imaging performance.

Second Example

The Second Example is described with reference to FIGS. 5 to 8 and Table 2. FIG. 5 is an optical path diagram showing the configuration of a microscope objective lens according to the Second Example. The microscope objective lens OL(2) according to the Second Example comprises, in order from an object on the optical axis: a first lens group G1 having a positive refractive power; a second lens group G2 that has a concave surface facing an image and has a positive refractive power; and a third lens group G3 that has a concave surface facing the object and has a positive refractive power. The gap between the distal end of the microscope objective lens OL(2) according to the Second Example and the cover slip CV covering the object OB is filled with the immersion liquid (oil). The gap between the cover slip CV and the object OB is filled with the immersion liquid (oil). Note that the refractive index of the immersion liquid for d-line (wavelength λ=587.6 nm) is assumed as 1.3985. The refractive index of the cover slip CV for d-line is assumed as 1.5244.

The first lens group G1 comprises, in order from the object on the optical axis, a cemented lens that has a positive refractive power, and includes a plano-convex-shaped positive lens L101 having a planar surface facing the object, and a negative meniscus lens L102 having a concave surface facing the object, which are cemented to each other.

The second lens group G2 comprises, in order from the object on the optical axis: a positive meniscus lens L201 having a concave surface facing the object; a cemented lens that includes a positive meniscus lens L202 having a concave surface facing the object, a biconcave negative lens L203, and a biconvex positive lens L204, which are cemented to each other; a cemented lens that includes a negative meniscus lens L205 having a convex surface facing the object, and a biconvex positive lens L206, which are cemented to each other; a cemented lens that includes a negative meniscus lens L207 having a convex surface facing the object, and a biconvex positive lens L208, which are cemented to each other; a cemented lens that includes a biconvex positive lens L209, and a biconcave negative lens L210, which are cemented to each other; and a cemented lens that includes a positive meniscus lens L211 having a convex surface facing the object, and a negative meniscus lens L212 having a convex surface facing the object, which are cemented to each other. The positive meniscus lens L202 of the second lens group G2 corresponds to the aforementioned predetermined positive lens that is of the second lens group G2 and is disposed closer to the object than the positive lens L206 through which the ray most distant from the optical axis passes.

The third lens group G3 comprises a cemented lens that includes, in order from the object on the optical axis, a negative meniscus lens L301 having a concave surface facing the object, a positive meniscus lens L302 having a concave surface facing the object, and a negative meniscus lens L303 having a concave surface facing the object, which are cemented to each other. The negative meniscus lens L303 of the third lens group G3 corresponds to the aforementioned predetermined negative lens described above. The negative meniscus lens L301 of the third lens group G3 corresponds to the aforementioned other negative lens described above. The positive meniscus lens L302 of the third lens group G3 corresponds to the aforementioned positive lens described above.

Note that it is configured so that by moving at least three lens components (single lenses or cemented lenses) of the second lens group G2 on the optical axis, the air distances between the lens components of the second lens group G2 can be changed in accordance with the thickness of the cover slip CV. The lens component of the second lens group G2 movable on the optical axis functions as what is called a correction collar, and can correct an aberration that changes in accordance with the thickness of the cover slip CV.

The following Table 2 lists values of data on the microscope objective lens according to Second Example. Note that the first surface is an object surface (OB).

TABLE 2

| [General Data] | |
| --- | --- |
| β = 60 times | f = 3.35 |
| NA = 1.30 | WD = 0.33 |
| νdA = 27.35 | θA = 0.6319 |
| νdX = 40.69 | θX = 0.5672 |
| νdP = 24.80 | θP = 0.6122 |
| νd2P = 27.35 | θ2P = 0.6319 |

| [Lens Data] | | | | | | |
| --- | --- | --- | --- | --- | --- | --- |
| Surface Number | R | D | nd | νd | H | θgF |
| 1 | ∞ | 0.23 | 1.3985 | 51.24 | | |
| 2 | ∞ | 0.17 | 1.5244 | 54.28 | | |
| 3 | ∞ | 0.10 | 1.3985 | 51.24 | | |
| 4 | ∞ | 0.71 | 1.4585 | 67.85 | | |
| 5 | −1.950 | 4.09 | 1.9538 | 32.33 | | |
| 6 | −4.018 | 0.20 | | | | |
| 7 | −17.836 | 3.19 | 1.4978 | 82.57 | 5.78 | |
| 8 | −9.123 | 0.20 | | | 6.61 | |
| 9 | −74.406 | 1.60 | 1.6638 | 27.35 | 7.80 | 0.6319 |
| 10 | −47.667 | 1.00 | 1.6127 | 44.46 | 8.19 | |
| 11 | 20.763 | 7.53 | 1.4978 | 82.57 | 9.42 | |
| 12 | −14.741 | 0.20 | | | 9.97 | |
| 13 | 94.360 | 0.60 | 1.6730 | 38.26 | 10.81 | |
| 14 | 25.009 | 8.17 | 1.4339 | 95.25 | 10.96 | |
| 15 | −16.828 | 0.20 | | | 11.18 | |
| 16 | 25.329 | 1.00 | 1.7432 | 49.26 | 10.11 | |
| 17 | 10.896 | 8.10 | 1.4339 | 95.25 | 9.08 | |

TABLE 2-continued

| | | [General Data] | | | |
|---|---|---|---|---|---|
| 18 | −22.754 | 0.65 | | | 8.99 |
| 19 | 13.846 | 6.26 | 1.4339 | 95.25 | 7.55 |
| 20 | −19.624 | 1.00 | 1.7321 | 46.18 | 6.36 |
| 21 | 14.492 | 0.20 | | | 5.57 |
| 22 | 6.131 | 4.44 | 1.4978 | 82.57 | 5.30 |
| 23 | 155.535 | 3.11 | 1.8061 | 33.34 | 4.53 |
| 24 | 3.579 | 4.38 | | | 2.71 |
| 25 | −5.941 | 1.00 | 1.8830 | 40.69 | 0.5672 |
| 26 | −20.799 | 4.45 | 1.8548 | 24.80 | 0.6122 |
| 27 | −4.874 | 1.00 | 1.6638 | 27.35 | 0.6319 |
| 28 | −10.618 | — | | | |

[Lens Group Data]

| Group | First surface | Focal length |
|---|---|---|
| G1 | 4 | 9.12 |
| G2 | 7 | 5.33 |
| G3 | 25 | 541.14 |

Figure 6:
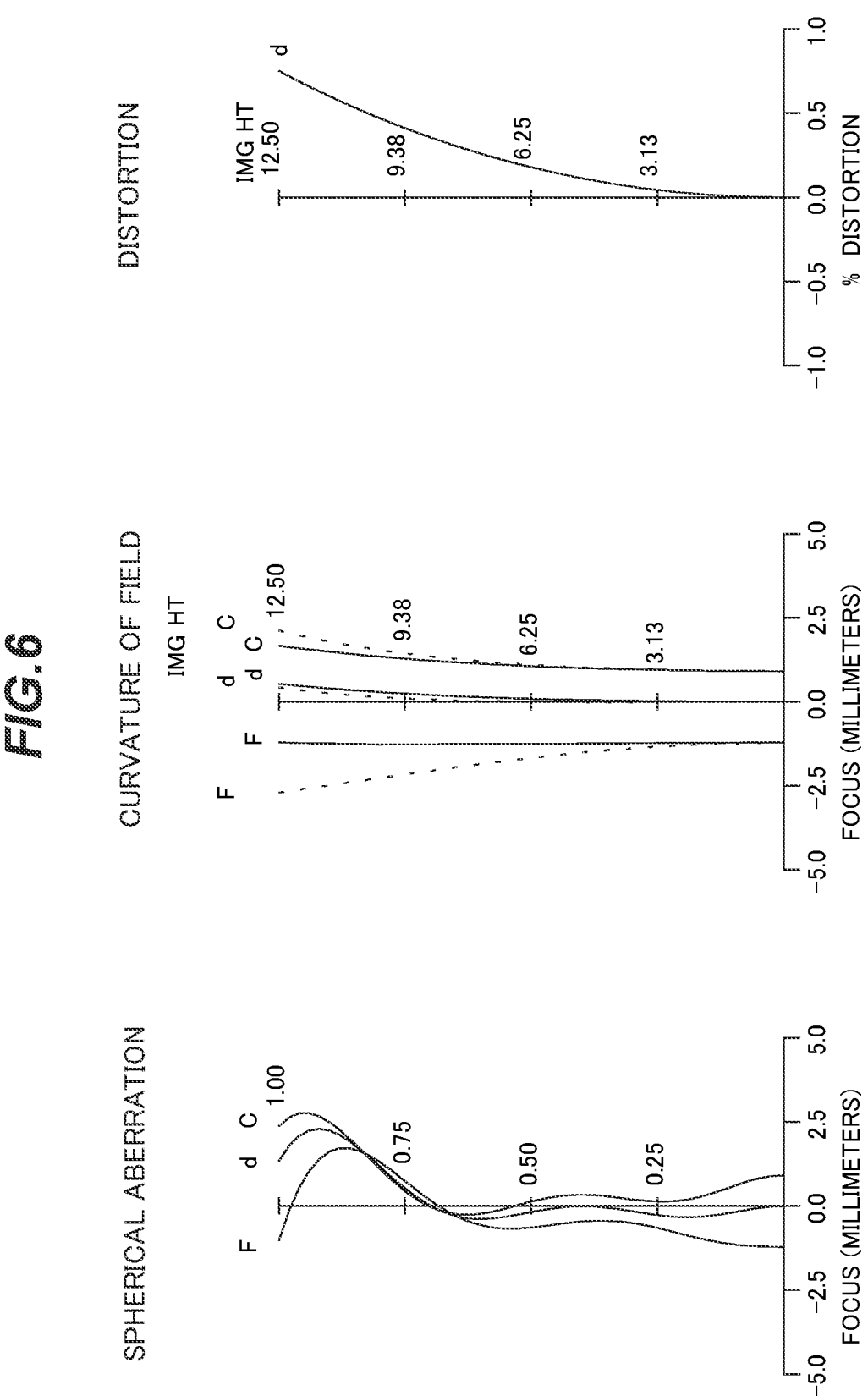
FIG. 6 depicts graphs showing various aberrations of the microscope objective lens according to the Second Example.
Figure 7:
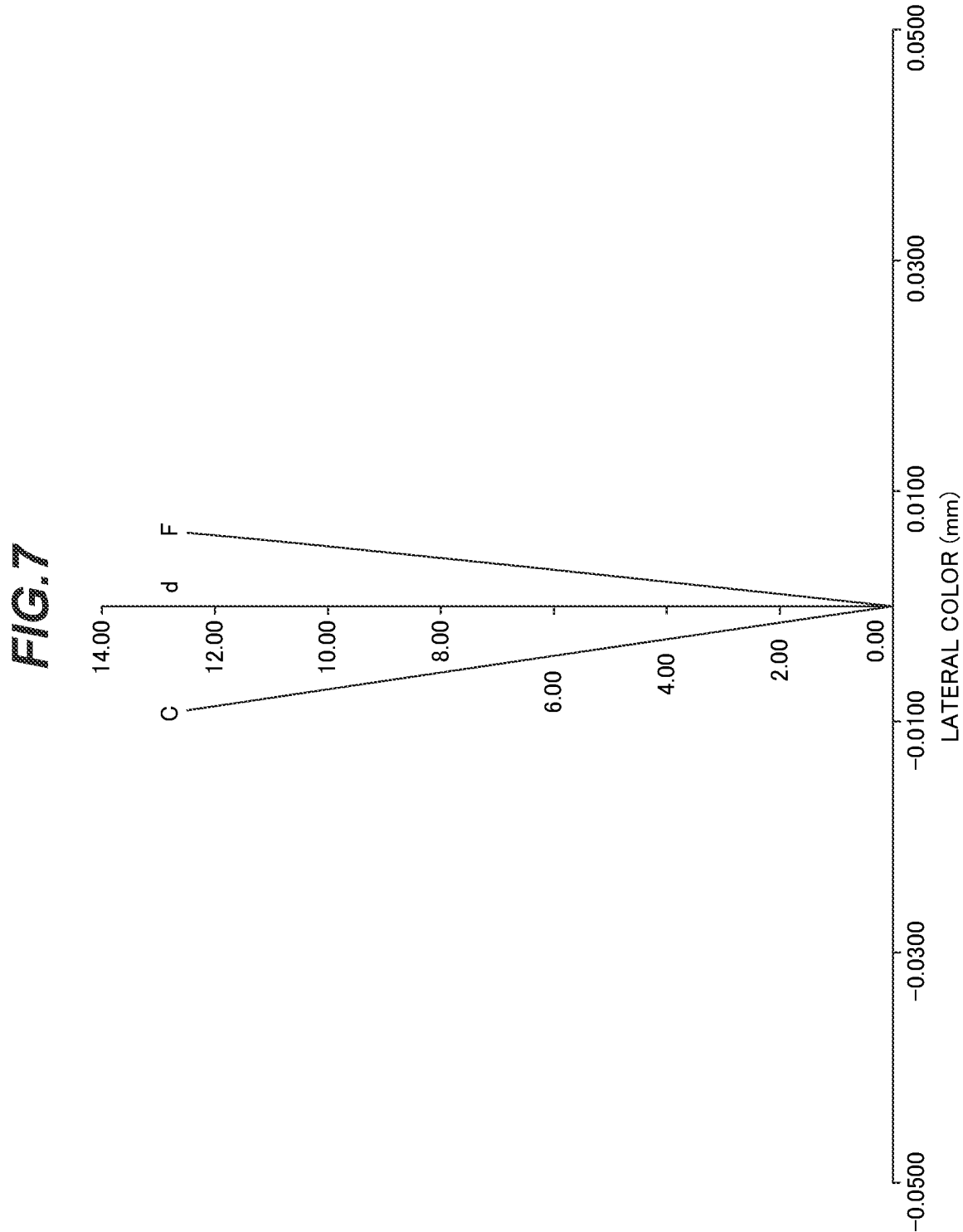
FIG. 7 depicts a chromatic aberration graph of the microscope objective lens according to the Second Example.
Figure 8:
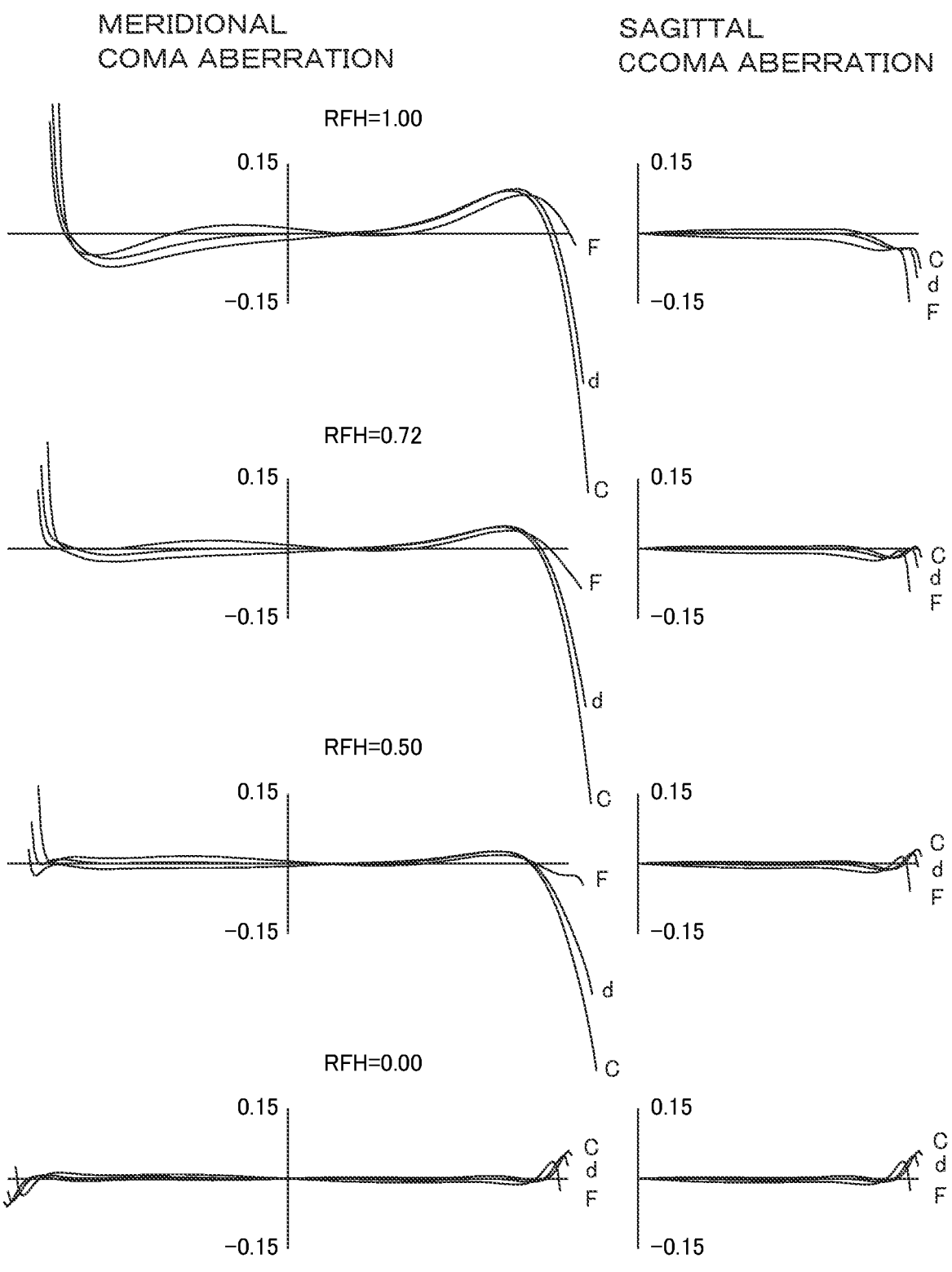
FIG. 8 depicts coma aberration graphs of the microscope objective lens according to the Second Example.

FIG. 6 shows various aberrations (the spherical aberration, curvature of field, and distortion) of the microscope objective lens according to the Second Example. FIG. 7 is a diagram showing chromatic aberrations of magnification (transverse chromatic aberrations) of the microscope objective lens according to the Second Example. FIG. 8 shows coma aberrations (meridional and sagittal coma aberrations) of the microscope objective lens according to the Second Example. Each aberration graph shows that the microscope objective lens according to the Second Example has favorably corrected various aberrations including the chromatic aberration of magnification, and has an excellent imaging performance.

Third Example

The Third Example is described with reference to FIGS. 9 to 12 and Table 3. FIG. 9 is an optical path diagram showing the configuration of a microscope objective lens according to the Third Example. The microscope objective lens OL(3) according to the Third Example comprises, in order from an object on the optical axis: a first lens group G1 having a positive refractive power; a second lens group G2 that has a concave surface facing an image and has a positive refractive power; and a third lens group G3 that has a concave surface facing the object and has a negative refractive power. The gap between the distal end of the microscope objective lens OL(3) according to the Third Example and the cover slip CV covering the object OB is filled with immersion liquid (oil). The gap between the cover slip CV and the object OB is filled with the immersion liquid (oil). Note that the refractive index of the immersion liquid for d-line (wavelength $\lambda=587.6$ nm) is assumed as 1.3985. The refractive index of the cover slip CV for d-line is assumed as 1.5244.

The first lens group G1 comprises, in order from the object on the optical axis, a cemented lens that has a positive refractive power, and includes a plano-convex-shaped positive lens L101 having a planar surface facing the object, and a negative meniscus lens L102 having a concave surface facing the object, which are cemented to each other.

The second lens group G2 comprises, in order from the object on the optical axis: a positive meniscus lens L201 having a concave surface facing the object; a cemented lens that includes a negative meniscus lens L202 having a convex surface facing the object, and a biconvex positive lens L203, which are cemented to each other; a cemented lens that includes a biconcave negative lens L204, and a biconvex positive lens L205, which are cemented to each other; a biconvex positive lens L206; a cemented lens that includes a negative meniscus lens L207 having a convex surface facing the object, and a biconvex positive lens L208, which are cemented to each other; a cemented lens that includes a biconvex positive lens L209, and a biconcave negative lens L210, which are cemented to each other; and a cemented lens that includes a positive meniscus lens L211 having a convex surface facing the object, and a negative meniscus lens L212 having a convex surface facing the object, which are cemented to each other. The positive lens L206 of the second lens group G2 corresponds to the aforementioned predetermined positive lens that is of the second lens group G2 and is disposed closer to the image than the positive lens L205 through which the ray most distant from the optical axis passes.

The third lens group G3 comprises, in order from the object on the optical axis: a negative meniscus lens L301 having a concave surface facing the object; and a cemented lens that includes a biconcave negative lens L302, and a biconvex positive lens L303, which are cemented to each other. The negative lens L302 of the third lens group G3 corresponds to the aforementioned predetermined negative lens described above. The negative meniscus lens L301 of the third lens group G3 corresponds to the aforementioned other negative lens described above. The positive lens L303 of the third lens group G3 corresponds to the aforementioned positive lens described above.

Note that it is configured so that by moving at least three lens components (single lenses or cemented lenses) of the second lens group G2 on the optical axis, the air distances between the lens components of the second lens group G2 can be changed in accordance with the thickness of the cover slip CV. The lens component of the second lens group G2 movable on the optical axis functions as what is called a correction collar, and can correct an aberration that changes in accordance with the thickness of the cover slip CV.

The following Table 3 lists values of data on the microscope objective lens according to the Third Example. Note that the first surface is an object surface (OB).

TABLE 3

| | [General Data] | |
|---|---|---|
| $\beta$ = 60 times | | WD = 0.33 |
| f = 3.33 | | $\theta$A = 0.6291 |
| NA = 1.30 | | $\theta$X = 0.5603 |
| vdA = 24.71 | | $\theta$P = 0.6122 |
| vdX = 48.10 | | $\theta$2P = 0.6065 |
| vdP = 24.80 | | |
| vd2P = 28.69 | | |

| | | [Lens Data] | | | | |
|---|---|---|---|---|---|---|
| Surface Number | R | D | nd | vd | H | $\theta$gF |
| 1 | ∞ | 0.23 | 1.3985 | 51.24 | | |
| 2 | ∞ | 0.17 | 1.5244 | 54.28 | | |
| 3 | ∞ | 0.10 | 1.3985 | 51.24 | | |
| 4 | ∞ | 0.70 | 1.4585 | 67.85 | | |
| 5 | −1.981 | 3.57 | 1.9538 | 32.33 | | |
| 6 | −3.764 | 0.15 | | | | |
| 7 | −9.331 | 3.35 | 1.4978 | 82.57 | 4.93 | |
| 8 | −6.865 | 0.20 | | | 5.96 | |
| 9 | 52.128 | 0.95 | 1.5530 | 55.07 | 8.08 | |
| 10 | 14.586 | 7.56 | 1.4978 | 82.57 | 8.83 | |
| 11 | −14.801 | 0.20 | | | 9.21 | |

21

TABLE 3-continued

[General Data]

| | | | | | | |
|---|---|---|---|---|---|---|
| 12 | −42.665 | 0.60 | 1.6730 | 38.26 | 9.32 | |
| 13 | 20.427 | 7.79 | 1.4339 | 95.25 | 9.80 | |
| 14 | −14.842 | 0.20 | | | 10.12 | |
| 15 | 150.000 | 2.24 | 1.7950 | 28.69 | 10.01 | 0.6065 |
| 16 | −82.523 | 0.20 | | | 9.96 | |
| 17 | 32.209 | 1.00 | 1.7432 | 49.26 | 9.55 | |
| 18 | 10.837 | 7.56 | 1.4339 | 95.25 | 8.65 | |
| 19 | −19.992 | 0.90 | | | 8.61 | |
| 20 | 19.684 | 4.11 | 1.4343 | 94.77 | 7.40 | |
| 21 | −18.502 | 1.00 | 1.7321 | 46.18 | 6.98 | |
| 22 | 31.936 | 0.20 | | | 6.45 | |
| 23 | 7.227 | 4.32 | 1.4343 | 94.77 | 6.03 | |
| 24 | 50.673 | 6.84 | 1.8503 | 32.35 | 5.39 | |
| 25 | 3.661 | 2.82 | | | 2.50 | |
| 26 | −5.314 | 0.90 | 1.7000 | 48.10 | | 0.5603 |
| 27 | −20.000 | 0.40 | | | | |
| 28 | −9.741 | 1.00 | 1.7558 | 24.71 | | 0.6291 |
| 29 | 11.123 | 5.00 | 1.8548 | 24.80 | | 0.6122 |
| 30 | −8.575 | — | | | | |

[Lens Group Data]

| Group | First surface | Focal length |
|---|---|---|
| G1 | 4 | 8.32 |
| G2 | 7 | 4.73 |
| G3 | 26 | −305.23 |

Figure 10:
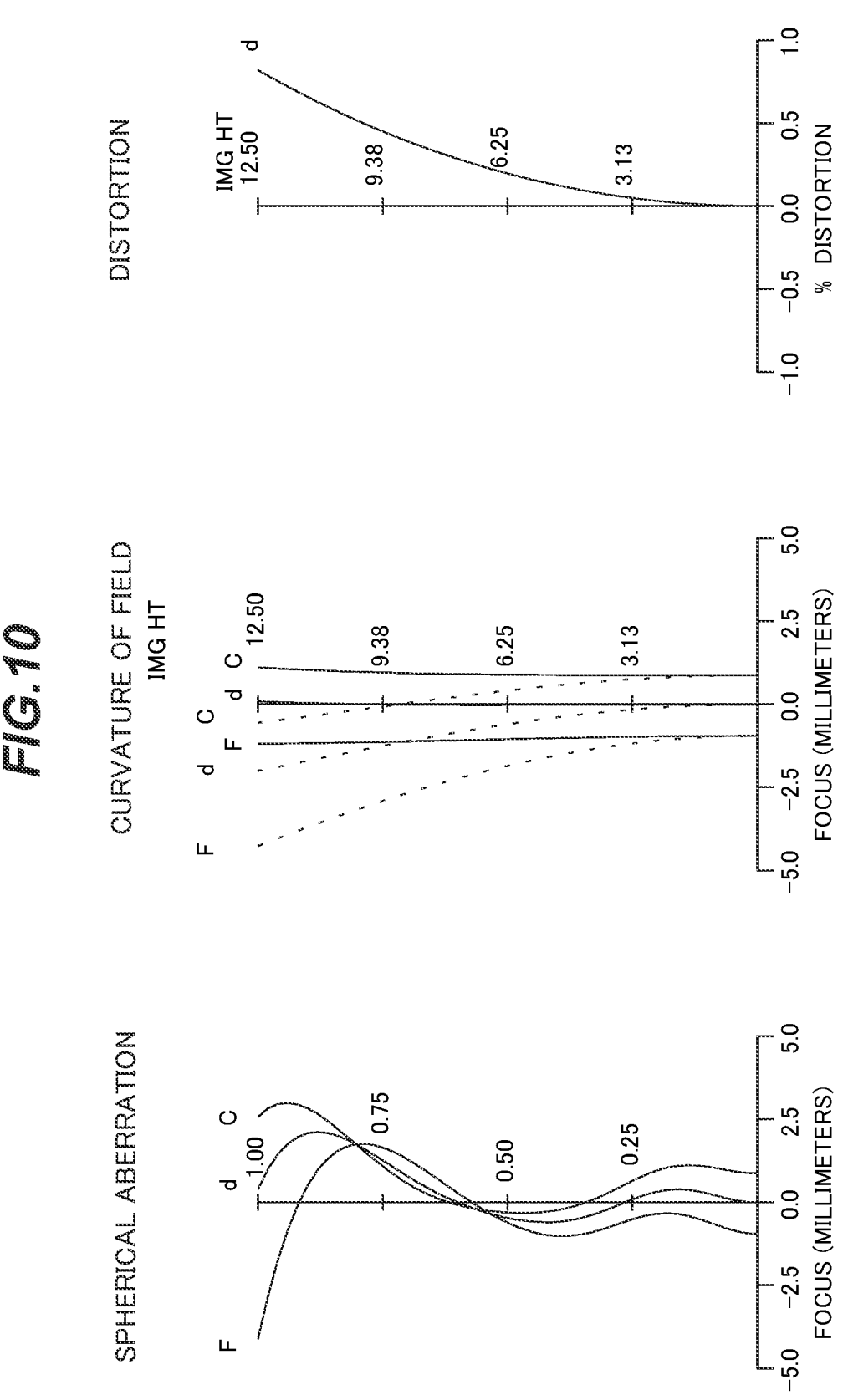
FIG. 10 depicts graphs showing various aberrations of the microscope objective lens according to the Third Example.
Figure 11:
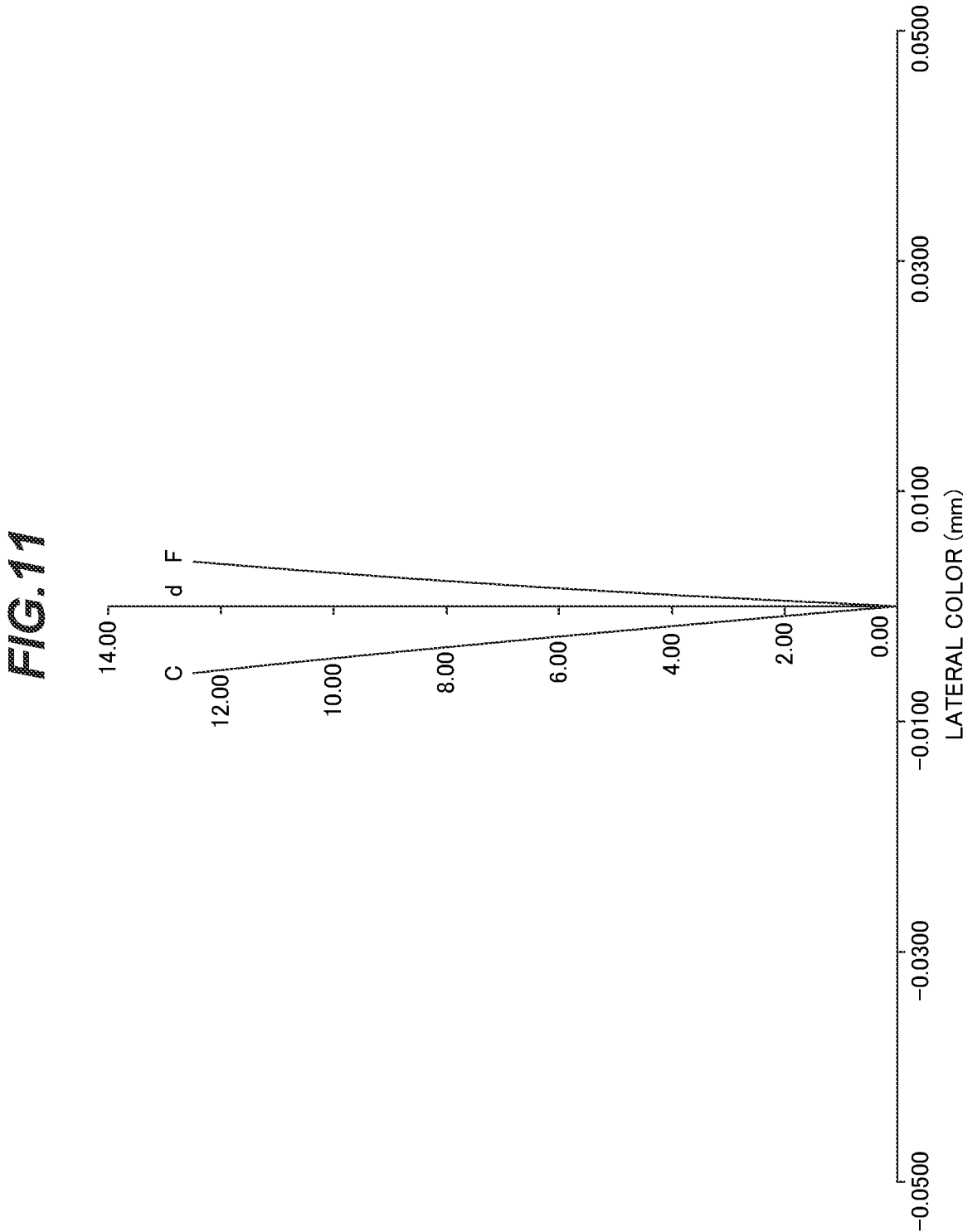
FIG. 11 depicts a chromatic aberration graph of the microscope objective lens according to the Third Example.
Figure 12:
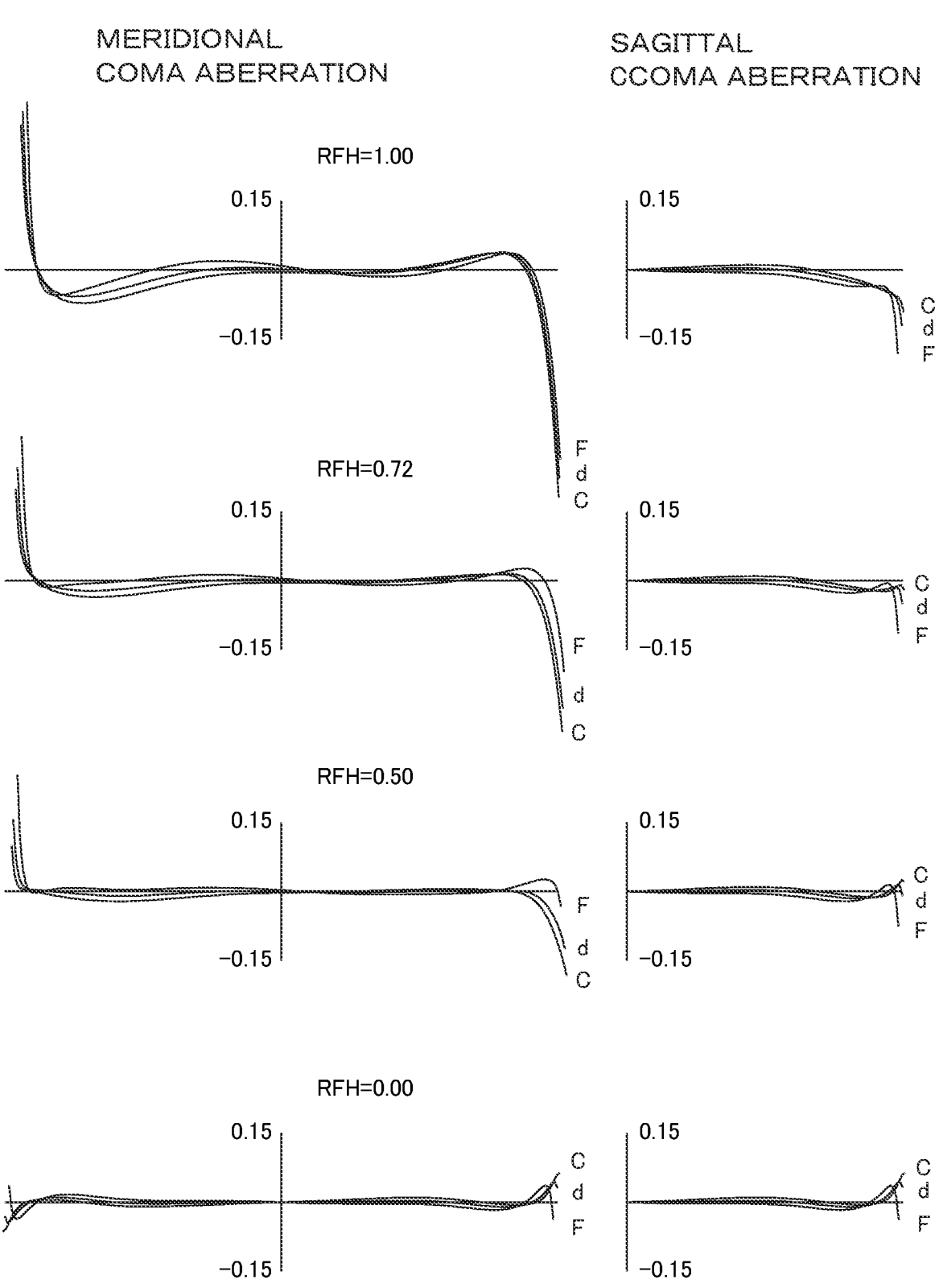
FIG. 12 depicts coma aberration graphs of the microscope objective lens according to the Third Example.

FIG. 10 shows various aberrations (spherical aberration, curvature of field, and distortion) of the microscope objective lens according to the Third Example. FIG. 11 is a diagram showing chromatic aberrations of magnification (transverse chromatic aberration) of the microscope objective lens according to the Third Example. FIG. 12 shows coma aberrations (meridional and sagittal coma aberrations) of the microscope objective lens according to the Third Example. Each aberration graph shows that the microscope objective lens according to the Third Example has favorably corrected various aberrations including the chromatic aberration of magnification, and has an excellent imaging performance.

Figure 13:
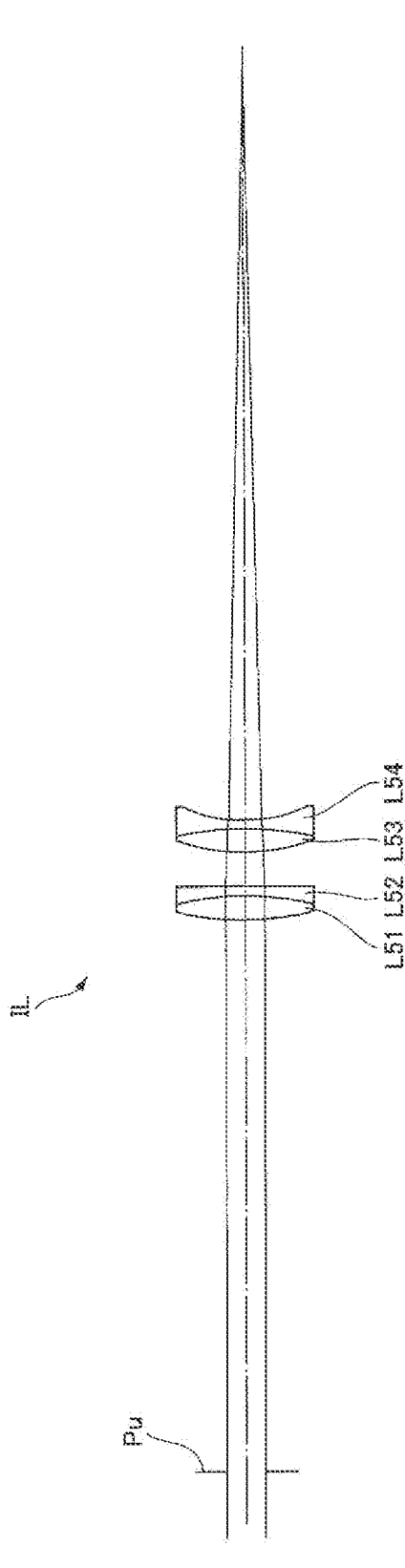
FIG. 13 is a sectional view showing a configuration of a second objective lens.

Since the microscope objective lens according to each Example is an infinite-distance correction type lens, this lens is used in combination with the second objective lens that collects light from the microscope objective lens. An example of the second objective lens used combined with the microscope objective lens is described with reference to FIG. 13 and Table 4. FIG. 13 is an optical path diagram showing the configuration of a second objective lens used in combination with the microscope objective lens according to each Example. The graphs showing various aberrations of the microscope objective lens according to each Example are those in cases of use combined with the second objective lens. The second objective lens IL shown in FIG. 13 comprises, in order from the object: a cemented lens that includes a biconvex positive lens L51, and a biconcave negative lens L52, which are cemented to each other; and a cemented lens that includes a biconvex positive lens L53, and a biconcave negative lens L54, which are cemented to each other. The second objective lens IL is disposed closer to the image than the microscope objective lens according to each Example. In FIG. 13, an entrance pupil plane Pu of the second objective lens IL is shown.

The following Table 4 lists values of data on the second objective lens. Note that in the table of [General Data], f' indicates the focal length of the second objective lens. In the table of [Lens Data], the surface number, R, D, nd, and νd are the same as those used in the description of the aforementioned Tables 1 to 3.

TABLE 4

[General Data]

f' = 200

[Lens Data]

| Surface Number | R | D | nd | νd |
|---|---|---|---|---|
| 1 | 75.043 | 5.100 | 1.62280 | 57.03 |
| 2 | −75.043 | 2.000 | 1.74950 | 35.19 |
| 3 | 1600.580 | 7.500 | | |
| 4 | 50.256 | 5.100 | 1.66755 | 41.96 |
| 5 | −84.541 | 1.800 | 1.61266 | 44.40 |
| 6 | 36.911 | — | | |

Next, a table of [Conditional Expression Corresponding Value] is shown below. This table collectively indicates values corresponding to the Conditional Expressions (1) to (9) with respect to all the Examples (First to Third Examples).

$$\nu dA < 40 \qquad \text{Conditional Expression (1)}$$

$$0 < \nu dX - \nu dA \qquad \text{Conditional Expression (2)}$$

$$0 < (\theta A - \theta X)/(\nu dA - \nu dX) \times (\nu dP - \nu dX) + \theta X - \theta P \qquad \text{Conditional Expression (3)}$$

$$0 < (\theta A - \theta X)/(\nu dA - \nu dX) \times (\nu dP - \nu dX) + \theta X - \theta P + 0.016 \qquad \text{Conditional Expression (4)}$$

$$0 < \theta A - (0.6438 - 0.001682 \times \nu dA + 0.007) \qquad \text{Conditional Expression (5)}$$

$$0 < \theta A - (0.6438 - 0.001682 \times \nu dA + 0.017) \qquad \text{Conditional Expression (6)}$$

$$1.68 < ndX \qquad \text{Conditional Expression (7)}$$

$$\nu d2P < 35 \qquad \text{Conditional Expression (8)}$$

$$0 < \theta 2P - (0.6438 - 0.001682 \times \nu d2P + 0.008) \qquad \text{Conditional Expression (9)}$$

| Conditional Expression | First Example | Second Example | Third Example |
|---|---|---|---|
| (1) | 27.35 | 27.35 | 24.71 |
| (2) | 20.75 | 13.34 | 23.39 |
| (3) | 0.0216 | 0.0321 | 0.0166 |
| (4) | 0.0066 | 0.0171 | 0.0016 |
| (5) | 0.0271 | 0.0271 | 0.0199 |
| (6) | 0.0171 | 0.0171 | 0.0099 |
| (7) | 1.7000 | 1.8830 | 1.7000 |
| (8) | 28.69 | 27.35 | 28.69 |
| (9) | 0.0030 | 0.0261 | 0.0030 |

According to each Example described above, the microscope objective lens where various aberrations including the chromatic aberration of magnification have been favorably corrected can be achieved.

The aforementioned Examples each describe a specific example of the present embodiment, and the present embodiment is not limited to them.

EXPLANATION OF NUMERALS AND CHARACTERS

| | |
|---|---|
| G1 First lens group | G2 Second lens group |
| G3 Third lens group | |

23

The invention claimed is:

1. A microscope objective lens, consisting of, in order from an object on an optical axis: a first lens group having a positive refractive power; a second lens group having a concave surface facing an image; and a third lens group having a concave surface facing the object, wherein the first lens group consists of a lens component having a positive refractive power, the third lens group consists of three or more lenses that include two negative lenses and one positive lens, at least one predetermined negative lens in the two negative lenses satisfies the following conditional expression, $$vdA < 40$$

where vdA: an Abbe number of the predetermined negative lens of the third lens group, and the microscope objective lens satisfies the following conditional expression, $$0 < \theta A - (0.6438 - 0.001682 \times vdA + 0.007)$$

where $\theta A$: a partial dispersion ratio of the predetermined negative lens of the third lens group, defined by the following expression assuming that a refractive index of the predetermined negative lens for g-line is ngA, a refractive index of the predetermined negative lens for F-line is nFA, and a refractive index of the predetermined negative lens for C-line is nCA, $$\theta A = (ngA - nFA)/(nFA - nCA).$$

2. The microscope objective lens according to claim 1, wherein the predetermined negative lens of the third lens group is one negative lens in the two negative lenses of the third lens group, and the following conditional expressions are satisfied, $$0 < vdX - vdA$$

$$0 < (\theta A - \theta X)/(vdA - vdX) \times (vdP - vdX) + \theta X - \theta P$$

where vdX: an Abbe number of another negative lens in the two negative lenses of the third lens group, vdP: an Abbe number of the positive lens of the third lens group, and $\theta A$: a partial dispersion ratio of the predetermined negative lens of the third lens group, defined by the following expression assuming that a refractive index of the predetermined negative lens for g-line is ngA, a refractive index of the predetermined negative lens for F-line is nFA, and a refractive index of the predetermined negative lens for C-line is nCA, $$\theta A = (ngA - nFA)/(nFA - nCA)$$

where $\theta X$: a partial dispersion ratio of the other negative lens of the third lens group, defined by the following expression assuming that a refractive index of the other negative lens for g-line is ngX, a refractive index of the other negative lens for F-line is nFX, and a refractive index of the other negative lens for C-line is nCX, $$\theta X = (ngX - nFX)/(nFX - nCX)$$

where $\theta P$: a partial dispersion ratio of the positive lens of the third lens group, defined by the following expression assuming that a refractive index of the positive lens for g-line is ngP, a refractive index of the positive lens for F-line is nFP, and a refractive index of the positive lens for C-line is nCP, $$\theta P = (ngP - nFP)/(nFP - nCP).$$

24

3. The microscope objective lens according to claim 2, wherein the predetermined negative lens of the third lens group is one negative lens in the two negative lenses of the third lens group, and the following conditional expressions are satisfied, $$0 < vdX - vdA$$

$$0 < (\theta A - \theta X)/(vdA - vdX) \times (vdP - vdX) + \theta X - \theta P - 0.015$$

where vdX: an abbe number Abbe number of another negative lens in the two negative lenses of the third lens group, vdP: an Abbe number of the positive lens of the third lens group, and $\theta A$: a partial dispersion ratio of the predetermined negative lens of the third lens group, defined by the following expression assuming that a refractive index of the predetermined negative lens for g-line is ngA, a refractive index of the predetermined negative lens for F-line is nFA, and a refractive index of the predetermined negative lens for C-line is nCA, $$\theta A = (ngA - nFA)/(nFA - nCA)$$

where $\theta X$: a partial dispersion ratio of the other negative lens of the third lens group, defined by the following expression assuming that a refractive index of the other negative lens for g-line is ngX, a refractive index of the other negative lens for F-line is nFX, and a refractive index of the other negative lens for C-line is nCX, $$\theta X = (ngX - nFX)/(nFX - nCX)$$

where $\theta P$: a partial dispersion ratio of the positive lens of the third lens group, defined by the following expression assuming that a refractive index of the positive lens for g-line is ngP, a refractive index of the positive lens for F-line is nFP, and a refractive index of the positive lens for C-line is nCP, $$\theta P = (ngP - nFP)/(nFP - nCP).$$

4. The microscope objective lens according to claim 1, wherein the following conditional expression is satisfied, $$0 < \theta A - (0.6438 - 0.001682 \times vdA + 0.017)$$

where $\theta A$: a partial dispersion ratio of the predetermined negative lens of the third lens group, defined by the following expression assuming that a refractive index of the predetermined negative lens for g-line is ngA, a refractive index of the predetermined negative lens for F-line is nFA, and a refractive index of the predetermined negative lens for C-line is nCA, $$\theta A = (ngA - nFA)/(nFA - nCA).$$

5. The microscope objective lens according to claim 1, wherein the predetermined negative lens of the third lens group is one negative lens in the two negative lenses of the third lens group, and another negative lens in the two negative lenses is disposed closer to the object than the predetermined negative lens, and closest to the object in the third lens group.

6. The microscope objective lens according to claim 5, wherein the following conditional expression is satisfied, $$1.68 < ndX$$

where ndX: a refractive index of the other negative lens of the third lens group for d-line.

7. The microscope objective lens according to claim 1, wherein the second lens group has a positive refractive power.

8. The microscope objective lens according to claim 1, wherein the second lens group includes a predetermined positive lens which satisfies the following conditional expression, $$vd2P<35$$

where vd2P: an Abbe number of the predetermined positive lens of the second lens group.

9. The microscope objective lens according to claim 1, wherein the second lens group includes a predetermined positive lens through which a ray most distant from the optical axis in the second lens group passes, and the predetermined positive lens satisfies the following conditional expressions, $$vd2P<35$$

$$0<\theta2P-(0.6438-0.001682\times vd2P+0.008)$$

where vd2P: an Abbe number of the predetermined positive lens of the second lens group, and
θ2P: a partial dispersion ratio of the predetermined positive lens of the second lens group, defined by the following expression assuming that a refractive index of the predetermined positive lens for g-line is ng2P, a refractive index of the predetermined positive lens for F-line is nF2P, and a refractive index of the predetermined positive lens for C-line is nC2P, $$\theta2P=(ng2P-nF2P)/(nF2P-nC2P).$$

10. The microscope objective lens according to claim 1, wherein the second lens group includes:
    a positive lens through which a ray most distant from the optical axis in the second lens group passes, and
    a predetermined positive lens disposed closer to the object than the positive lens through which the ray most distant from the optical axis passes, and
the predetermined positive lens satisfies the following conditional expressions, $$vd2P<35$$

$$0<\theta2P-(0.6438-0.001682\times vd2P+0.008)$$

where vd2P: an Abbe number of the predetermined positive lens of the second lens group, and
θ2P: a partial dispersion ratio of the predetermined positive lens of the second lens group, defined by the following expression assuming that a refractive index of the predetermined positive lens for g-line is ng2P, a refractive index of the predetermined positive lens for F-line is nF2P, and a refractive index of the predetermined positive lens for C-line is nC2P, $$\theta2P=(ng2P-nF2P)/(nF2P-nC2P).$$

11. The microscope objective lens according to claim 1, wherein the second lens group includes:
    a positive lens through which a ray most distant from the optical axis in the second lens group passes, and
    a predetermined positive lens disposed closer to the image than the positive lens through which the ray most distant from the optical axis passes, and the predetermined positive lens satisfies the following conditional expressions, $$vd2P<35$$

$$0<\theta2P-(0.6438-0.001682\times vd2P+0.008)$$

where vd2P: an Abbe number of the predetermined positive lens of the second lens group, and
θ2P: a partial dispersion ratio of the predetermined positive lens of the second lens group, defined by the following expression assuming that a refractive index of the predetermined positive lens for g-line is ng2P, a refractive index of the predetermined positive lens for F-line is nF2P, and a refractive index of the predetermined positive lens for C-line is nC2P, $$\theta2P=(ng2P-nF2P)/(nF2P-nC2P).$$

12. The microscope objective lens according to claim 1, wherein the lens component of the first lens group is a cemented lens that includes a plano-convex-shaped positive lens having a planar surface facing the object.

13. A microscope optical system, comprising the microscope objective lens according to claim 1; and a second objective lens that collects light from the microscope objective lens.

14. A microscope device, comprising the microscope objective lens according to claim 1.

15. A microscope objective lens, consisting of, in order from an object on an optical axis: a first lens group having a positive refractive power; a second lens group having a concave surface facing an image; and a third lens group having a concave surface facing the object,
    wherein the first lens group consists of a lens component having a positive refractive power, and
    the second lens group includes a predetermined positive lens which satisfies the following conditional expressions, $$vd2P<35$$

$$0<\theta2P-(0.6438-0.001682\times vd2P+0.008)$$

where vd2P: an Abbe number of the predetermined positive lens of the second lens group, and
θ2P: a partial dispersion ratio of the predetermined positive lens of the second lens group, defined by the following expression assuming that a refractive index of the predetermined positive lens for g-line is ng2P, a refractive index of the predetermined positive lens for F-line is nF2P, and a refractive index of the predetermined positive lens for C-line is nC2P, $$\theta2P=(ng2P-nF2P)/(nF2P-nC2P).$$

16. The microscope objective lens according to claim 15, wherein the third lens group includes two negative lenses, and
at least one predetermined negative lens in the two negative lenses satisfies the following conditional expression, $$vdA<40$$

where vdA: an Abbe number of the predetermined negative lens of the third lens group.

17. A microscope optical system, comprising the microscope objective lens according to claim 15; and a second objective lens that collects light from the microscope objective lens.

18. A microscope device, comprising the microscope objective lens according to claim 15.

* * * * *